(12) United States Patent
Kim et al.

(10) Patent No.: US 11,856,594 B2
(45) Date of Patent: Dec. 26, 2023

(54) METHOD AND APPARATUS FOR TRANSMITTING AND RECEIVING CONTROL INFORMATION IN WIRELESS COMMUNICATION SYSTEM

(71) Applicant: Samsung Electronics Co., Ltd., Gyeonggi-do (KR)

(72) Inventors: Tae Hyoung Kim, Gyeonggi-do (KR); Young Bum Kim, Gyeonggi-do (KR); Hee Don Gha, Gyeongg-do (KR); Tae Han Bae, Gyeonggi-do (KR); Seung Hoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/762,843

(22) PCT Filed: Nov. 8, 2018

(86) PCT No.: PCT/KR2018/013537
§ 371 (c)(1),
(2) Date: May 8, 2020

(87) PCT Pub. No.: WO2019/093785
PCT Pub. Date: May 16, 2019

(65) Prior Publication Data
US 2021/0045121 A1  Feb. 11, 2021

(30) Foreign Application Priority Data

Nov. 10, 2017  (KR) .................. 10-2017-0149946
Nov. 29, 2017  (KR) .................. 10-2017-0162243
Nov. 30, 2017  (KR) .................. 10-2017-0163525

(51) Int. Cl.
*H04W 72/53*   (2023.01)
*H04W 72/0453*  (2023.01)
(Continued)

(52) U.S. Cl.
CPC ........... *H04W 72/53* (2023.01); *H04L 1/1614* (2013.01); *H04L 5/0051* (2013.01);
(Continued)

(58) Field of Classification Search
None
See application file for complete search history.

(56) References Cited

U.S. PATENT DOCUMENTS 9,167,510 B2 * 10/2015 Fu .................... H04W 48/16
9,344,259 B2 *  5/2016 Love ................... H04L 5/003
(Continued)

FOREIGN PATENT DOCUMENTS

CN  105391525 A  *  3/2016
CN  102771058 B  * 12/2016  ............... H01Q 1/00
(Continued)

OTHER PUBLICATIONS

Huawei, HiSilicon, "On NR-PDCCH Structure", R1-1715394, 3GPP TSG RAN WG1 Meeting AH_NR#3, Sep. 18-21, 2017, 8 pages.
(Continued)

*Primary Examiner* — Andrew C Oh
(74) *Attorney, Agent, or Firm* — The Farrell Law Firm, P.C.

(57) ABSTRACT

The disclosure provides a method of transmitting downlink (DL) control information, the method including: transmitting configuration information about a CORESET in which DL control information is to be transmitted; mapping the DL control information to a plurality of resource elements (REs) in the CORESET determined based on the configuration information; and transmitting the DL control information via the plurality of REs.

16 Claims, 15 Drawing Sheets

(51) Int. Cl.
*H04L 5/00* (2006.01)
*H04W 72/1263* (2023.01)
*H04L 1/1607* (2023.01)
*H04W 72/23* (2023.01)

(52) U.S. Cl.
CPC ... *H04W 72/0453* (2013.01); *H04W 72/1263* (2013.01); *H04W 72/23* (2023.01)

(56) References Cited

U.S. PATENT DOCUMENTS

| | | | | |
|---|---|---|---|---|
| 11,239,971 | B2* | 2/2022 | Chen | H04L 5/0053 |
| 2010/0150090 | A1* | 6/2010 | Park | H04L 1/0067 370/329 |
| 2010/0232373 | A1* | 9/2010 | Nory | H04W 72/23 370/329 |
| 2011/0261769 | A1* | 10/2011 | Ji | H04L 5/0007 370/329 |
| 2013/0039386 | A1* | 2/2013 | Zhou | H04L 5/0023 375/135 |
| 2013/0100833 | A1* | 4/2013 | Xu | H04J 13/0062 370/252 |
| 2013/0107822 | A1* | 5/2013 | Papasakellariou | H04W 72/04 370/329 |
| 2013/0242904 | A1* | 9/2013 | Sartori | H04W 72/23 370/329 |
| 2014/0036810 | A1* | 2/2014 | Harrison | H04W 72/21 370/329 |
| 2014/0036813 | A1* | 2/2014 | Lunttila | H04W 72/21 370/329 |
| 2014/0036889 | A1* | 2/2014 | Kim | H04W 72/0446 370/336 |
| 2014/0071915 | A1* | 3/2014 | Papasakellariou | H04L 5/0092 370/329 |
| 2014/0105155 | A1* | 4/2014 | Kim | H04L 1/1854 370/329 |
| 2014/0112283 | A1* | 4/2014 | Kim | H04L 5/0053 370/329 |
| 2014/0119335 | A1* | 5/2014 | Wang | H04L 5/0092 370/329 |
| 2014/0204825 | A1* | 7/2014 | Ekpenyong | H04L 5/001 370/312 |
| 2014/0334431 | A1* | 11/2014 | Zhou | H04W 72/04 370/329 |
| 2014/0376479 | A1* | 12/2014 | Imamura | H04L 5/0023 370/329 |
| 2015/0023266 | A1* | 1/2015 | Imamura | H04L 5/005 370/329 |
| 2015/0043480 | A1* | 2/2015 | Lee | H04L 5/0092 370/329 |
| 2015/0131579 | A1* | 5/2015 | Li | H04L 1/1858 370/329 |
| 2015/0181574 | A1* | 6/2015 | Lee | H04L 1/0072 370/329 |
| 2015/0237624 | A1* | 8/2015 | Tang | H04W 72/0446 370/329 |
| 2015/0296491 | A1* | 10/2015 | Nam | H04L 5/0037 370/329 |
| 2015/0358985 | A1* | 12/2015 | Chen | H04W 72/20 370/328 |
| 2016/0029365 | A1* | 1/2016 | Papasakellariou | H04L 1/1896 370/329 |
| 2017/0230947 | A1 | 8/2017 | Liu et al. | |
| 2018/0049068 | A1* | 2/2018 | Agiwal | H04W 16/14 |
| 2018/0049168 | A1* | 2/2018 | Ryu | H04L 5/0044 |
| 2018/0049203 | A1* | 2/2018 | Xue | H04L 5/0035 |
| 2018/0063865 | A1* | 3/2018 | Islam | H04L 5/0064 |
| 2018/0184410 | A1* | 6/2018 | John Wilson | H04L 5/0053 |
| 2018/0213477 | A1* | 7/2018 | John Wilson | H04W 28/22 |
| 2018/0227922 | A1* | 8/2018 | Lee | H04L 5/0044 |
| 2018/0249487 | A1* | 8/2018 | Takeda | H04L 27/2636 |
| 2018/0295649 | A1* | 10/2018 | Bhorkar | H04W 16/14 |
| 2018/0324841 | A1* | 11/2018 | Horiuchi | H04W 72/04 |
| 2019/0069150 | A1* | 2/2019 | Blankenship | H04W 68/02 |
| 2019/0081821 | A1* | 3/2019 | Bendlin | H04L 5/0037 |
| 2019/0182884 | A1* | 6/2019 | Deenoo | H04W 16/28 |
| 2019/0191453 | A1* | 6/2019 | Xiong | H04L 5/0037 |
| 2019/0306847 | A1* | 10/2019 | Seo | H04W 72/046 |
| 2019/0364558 | A1* | 11/2019 | Kim | H04L 5/0053 |
| 2020/0015266 | A1* | 1/2020 | Yan | H04W 74/006 |
| 2020/0045672 | A1* | 2/2020 | Yang | H04W 48/12 |
| 2020/0119874 | A1* | 4/2020 | Liu | H04W 72/23 |
| 2020/0163085 | A1* | 5/2020 | Takeda | H04L 5/0094 |
| 2020/0187238 | A1* | 6/2020 | Miao | H04L 5/0094 |
| 2020/0213065 | A1* | 7/2020 | Takeda | H04L 5/0092 |
| 2020/0213988 | A1* | 7/2020 | Zhou | H04W 72/20 |
| 2020/0214015 | A1* | 7/2020 | Zhou | H04W 72/1268 |
| 2020/0229154 | A1* | 7/2020 | Takeda | H04L 27/26 |
| 2020/0252180 | A1* | 8/2020 | Takeda | H04W 72/12 |
| 2020/0314776 | A1* | 10/2020 | Harada | H04W 72/04 |
| 2020/0359361 | A1* | 11/2020 | Takeda | H04W 72/23 |
| 2020/0374866 | A1* | 11/2020 | Takeda | H04W 72/21 |
| 2021/0014791 | A1* | 1/2021 | Freda | H04W 52/0277 |
| 2021/0075581 | A1* | 3/2021 | Takeda | H04W 72/23 |
| 2021/0092717 | A1* | 3/2021 | Takeda | H04W 72/04 |
| 2021/0120537 | A1* | 4/2021 | Lei | H04L 1/1893 |
| 2021/0144714 | A1* | 5/2021 | Takeda | H04W 72/53 |
| 2021/0329594 | A1* | 10/2021 | Shen | H04W 72/1273 |

FOREIGN PATENT DOCUMENTS

| | | | | |
|---|---|---|---|---|
| CN | 104126328 B | * | 10/2018 | H04L 5/001 |
| JP | 2014171004 A | * | 9/2014 | |
| WO | WO-2010088536 A1 | * | 8/2010 | H04L 5/0007 |
| WO | WO-2014019141 A1 | * | 2/2014 | H04W 16/12 |
| WO | WO-2017113901 A1 | * | 7/2017 | H04L 1/00 |
| WO | WO-2018203408 A1 | * | 11/2018 | H04L 5/0053 |
| WO | WO-2019056390 A1 | * | 3/2019 | H04L 5/00 |

OTHER PUBLICATIONS

NEC, "PDCCH Structure for NR", R1-1707199, 3GPP TSG RAN WG1 Meeting #89, May 15-19, 2017, 4 pages.
Guangdong OPPO Mobile Telecom, "Discussion of Search Space Design", R1-1715686, 3GPP TSG RAN WG1 Meeting NR#3, Sep. 18-21, 2017, 13 pages.
LG Electronics, "Discussion on Control Channel Design", R1-1700493, 3GPP TSG RAN WG1 Meeting NR Ad-Hoc Meeting, Jan. 16-20, 2017, 7 pages.
ZTE, "CCE Mapping with REG Bundling", R1-1710104, 3GPP TSG RAN WG1 NR Ad-Hoc#2, Jun. 27-30, 2017, 16 pages.
International Search Report dated Feb. 15, 2019 issued in counterpart application No. PCT/KR2018/013537, 19 pages.
Vivo, "Remaining Issues for CORESET Configuration", R1-1712846, 3GPP TSG RAN WG1 Meeting #90, Aug. 21-25, 2017, 4 pages.
Korean Office Action dated Feb. 4, 2022 issued in counterpart application No. 10-2017-0163525, 7 pages.
LG Electronics, "Discussion on Resource Allocation and TBS Determination", R1-1715885, 3GPP TSG RAN WG1 Meeting NR#3, Sep. 18-21, 2017, 16 pages.
Korean Office Action dated Aug. 25, 2022 issued in counterpart application No. 10-2017-0163525, 8 pages.
KR Decision to Refuse dated Feb. 14, 2023 issued in counterpart application No. 10-2017-0163525, 5 pages.

* cited by examiner

METHOD AND APPARATUS FOR TRANSMITTING AND RECEIVING CONTROL INFORMATION IN WIRELESS COMMUNICATION SYSTEM

PRIORITY

This application is a National Phase Entry of PCT International Application No. PCT/KR2018/013537 which was filed on Nov. 8, 2018, and claims priority to Korean Patent Application Nos. 10-2017-0149946, 10-2017-0162243 and 10-2017-0163525, which were filed on Nov. 10, 2017, Nov. 29, 2017 and Nov. 30, 2017, respectively, the content of each of which is incorporated herein by reference.

TECHNICAL FIELD

The disclosure relates to a wireless communication system, and in detail, to a method and apparatus for smoothly providing a service in a wireless communication system. More particularly, the disclosure relates to a method and apparatus for transmitting and receiving control information in a wireless communication system.

BACKGROUND ART

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency millimeter-wave (mmWave) band (e.g., a 60-gigahertz (GHz) band) is being considered. To reduce path loss of electric waves and increase a transmission distance of electric waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 3eG communication technology and IoT technology.

Because various services may be provided due to the aforementioned technical features and the development of wireless communication systems, methods for effectively providing these services are required.

DESCRIPTION OF EMBODIMENTS

Technical Problem

Disclosed embodiments may provide a method and apparatus for transmitting and receiving control information for effectively providing a service.

Solution to Problem

In the disclosure, provided is a method of effectively transmitting and receiving downlink (DL) control information in a wireless communication system.

Advantageous Effects of Disclosure

According to disclosed embodiments, a service may be effectively provided in a wireless communication system.

BEST MODE

Figure 1:
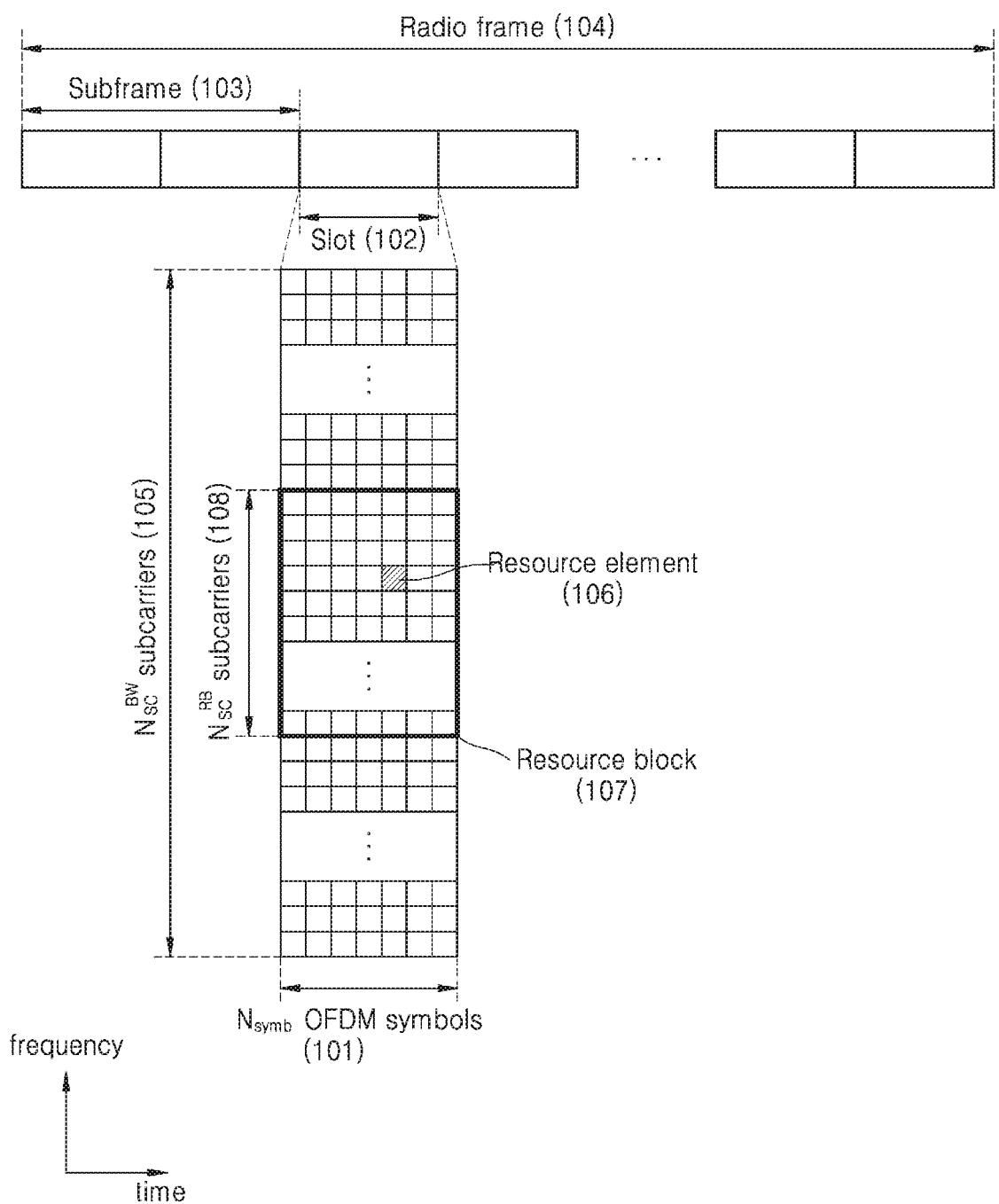
FIG. 1 illustrates a basic structure of a time-frequency domain in a long term evolution (LTE) system or a system similar thereto, according to some embodiments.

According to some embodiments of the disclosure, a method of transmitting downlink (DL) control information may include: transmitting configuration information about a CORESET in which the DL control information is to be transmitted; mapping the DL control information to a plurality of resource elements (REs) in the CORESET determined based on the configuration information; and transmitting the DL control information via the plurality of REs.

The plurality of REs in the CORESET may be identified based on a time index and a frequency index, and the mapping of the DL control information to the plurality of REs may include mapping the control information, based on an ascending order of a second index of the plurality of REs having a same first index, wherein the second index is the time index when the first index is the frequency index, or the first index is the time index when the second index is the frequency index.

The CORESET may include a plurality of Control Channel Elements (CCEs), and the plurality of CCEs are identified based on CCE indexes, and the mapping of the DL control information to the plurality of REs may include mapping the control information to the plurality of REs included in a CCE, based on an ascending order of the CCE indexes.

The CCE may include a plurality of Resource Element Group (REG) bundles, and the plurality of REG bundles are identified based on REG bundle indexes, and the mapping of the DL control information to the plurality of REs may include mapping the control information to the plurality of REs included in a REG bundle, in further consideration of an ascending order of the REG bundle indexes.

The REG bundle may include a plurality of REGs, and the plurality of REGs are identified based on REG indexes, and the mapping of the DL control information to the plurality of REs may include mapping the control information to the plurality of REs included in a REG, in further consideration of an ascending order of the REG indexes.

The transmitting of the configuration information may include transmitting frequency allocation information of the CORESET, based on a common Physical Resource Block (PRB) index or a PRB index of a frequency bandwidth part allocated to a user equipment (UE).

According to some embodiments of the disclosure, a method of obtaining DL control information may include: receiving configuration information about a CORESET in which the DL control information is to be transmitted; determining a position of the CORESET, based on the configuration information; and obtaining DL control information mapped to a plurality of REs in the determined CORESET.

The plurality of REs may be identified based on a time index and a frequency index, and the DL control information may be mapped based on an ascending order of a second index of the plurality of REs having a same first index, wherein the second index is the time index when the first index is the frequency index, or the first index is the time index when the second index is the frequency index.

The receiving of the configuration information may include receiving frequency allocation information of the CORESET, based on a common PRB index or a PRB index of a frequency bandwidth part allocated to a UE.

According to some embodiments of the disclosure, a base station (BS) for transmitting DL control information may include: a transceiver; at least one memory storing a program for transmitting the DL control information; and at least one processor configured to transmit configuration information about a CORESET in which DL control information is to be transmitted, map the DL control information to a plurality of REs in the CORESET determined based on the configuration information, and transmit the DL control information via the plurality of REs.

The plurality of REs in the CORESET may be identified based on a time index and a frequency index, and the at least one processor may be further configured to map the control information, based on an ascending order of a second index of the plurality of REs having a same first index, wherein the second index is the time index when the first index is the frequency index, or the first index is the time index when the second index is the frequency index.

The CORESET may include a plurality of CCEs, and the plurality of CCEs are identified based on CCE indexes, and the at least one processor may be further configured to map the control information to the plurality of REs included in a CCE, based on an ascending order of the CCE indexes.

The CCE may include a plurality of REG bundles, and the plurality of REG bundles are identified based on REG bundle indexes, and the at least one processor may be further configured to map the control information to the plurality of REs included in a REG bundle, in further consideration of an ascending order of the REG bundle indexes.

The REG bundle may include a plurality of REGs, and the plurality of REGs may be identified based on REG indexes, and the at least one processor may be further configured to map the control information to the plurality of REs included in a REG, in further consideration of an ascending order of the REG indexes.

According to some embodiments of the disclosure, a UE for obtaining DL control information may include a transceiver; at least one memory storing a program for obtaining the DL control information; and at least one processor configured to receive configuration information about a CORESET in which DL control information is to be transmitted, determine a position of the CORESET, based on the configuration information, and obtain DL control information mapped to a plurality of REs in the determined CORESET.

MODE OF DISCLOSURE

Embodiments of the disclosure will now be described more fully with reference to the accompanying drawings.

In the following description of embodiments, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments described in detail below with reference to the accompanying drawings. The disclosure may, however, be embodied in many different forms and should not be construed as limited to embodiments set forth herein; rather these embodiments of the disclosure are provided so that this disclosure will be thorough and complete, and will fully convey the scope of the disclosure only defined by the claims to one of ordinary skill in the art. Throughout the specification, the same elements are denoted by the same reference numerals. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms should be understood based on the entire description of the present specification.

Hereinafter, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a UE, a mobile station (MS), a cellular phone, a smartphone, a computer, or a multimedia system capable of performing communication functions. In the disclosure, a downlink (DL) refers to a wireless transmission path of a signal to be transmitted from a BS to a UE, and an uplink (UL) refers to a wireless transmission path of a signal to be transmitted from a UE to a BS. Although embodiments of the disclosure are described below by using long term evolution (LTE) or LTE-advanced (LTE-A) systems as an example, the embodiments of the disclosure are also applicable to other communication systems having similar technical backgrounds or channel structure. For example, $5^{th}$ generation (5G) new radio (NR) mobile communication technology developed after LTE-A may belong thereto, and hereinafter, 5G may be indicated as a concept including existing LTE, LTE-A, and other similar services. Also, the disclosure may be applied to other communication systems through modification at the discretion of one of ordinary skill in the art without greatly departing from the scope of the disclosure.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in an embodiment of the disclosure.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-Advanced (LTE-A), LTE-Pro, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link through which a UE (also referred to as an MS) transmits data or a control signal to a BS (e.g., eNB), and the DL refers to a radio link through which a BS transmits data or a control signal to a UE. The above-described multiple access schemes identify data or control information of different users in a manner that time-frequency resources for carrying the data or control information of the users are allocated and managed not to overlap each other, that is, to achieve orthogonality therebetween.

As post-LTE systems, 5G systems need to support services capable of reflecting and satisfying various requirements of users, service providers, and the like. Services considered for the 5G systems include enhanced mobile broadband (eMBB), massive machine-type communication (mMTC), ultra-reliability low-latency communication (URLLC) services, or the like. However, the disclosure is not limited to the examples and thus may further include various types of services.

The eMBB aims to provide an improved data rate than a data rate supported by the existing LTE, LTE-A, or LTE-Pro. For example, in a 5G communication system, the eMBB should be able to provide a peak data rate of 20 Gbps in a DL and a peak data rate of 10 Gbps in an UL at one BS. Also, the 5G communication system aims to provide a maximum data rate and simultaneously to provide an increased user-perceived data rate of a UE. In order to satisfy such requirements, there is a need for an improvement in transmission/reception technology including an improved multiple-input multiple-output (MIMO) transmission technology. Also, the current LTE transmits a signal by using a maximum 20 MHz transmission bandwidth in the 2 GHz band, but the 5G communication system uses a frequency bandwidth wider than 20 MHz in the 3 GHz to 6 GHz or 6 GHz or more frequency band, thereby satisfying data rates requested by the 5G communication. However, a frequency band and a frequency bandwidth are not limited to the examples.

Simultaneously, the mMTC is being considered to support application services such as IoT in 5G communication systems. In order to efficiently provide the IoT, the mMTC may require the support for a large number of terminals in a cell, improved coverage for a terminal, improved battery time, reduced cost of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication systems. The terminal supporting the mMTC should be configured as a low-cost terminal and may require a very long battery life time because it is difficult to frequently replace the battery of the terminal.

The URLLC refers to cellular-based wireless communication services used for mission-critical purposes. For example, services for remote control of robots or machinery, industrial automation, unmanned aerial vehicles, remote health care, emergency alerts, and the like may be included therein. Therefore, the URLLC should provide communications providing ultra-low latency and ultra-high reliability. For example, a service supporting the URLLC should satisfy air interface latency of less than 0.5 milliseconds, and simultaneously has a requirement for a packet error rate of $10^{-5}$ or less. Thus, for the service supporting the URLLC, the 5G system should provide a Transmit Time Interval (TTI) smaller than other services and simultaneously has a design requirement for allocating wide resources in a frequency band so as to ensure reliability of a communication link.

The three services, i.e., the eMBB, the URLLC, and the mMTC, of 5G may be multiplexed and transmitted in one system. In this regard, the services may use different transmission and reception schemes and different transmission and reception parameters so as to satisfy different requirements of the services.

According to some embodiments, in 5G, each UE may be configured, via Radio Resource Control (RRC) signaling, with a Control Resource Set (CORESET) that is time and frequency resources in which a DL control channel can be transmitted. In this regard, a base station may indicate a UE of frequency-axis resource allocation with respect to the CORESET through a bitmap of a 6-Resource Block (6RB) unit. CORESETs of UEs with which different bandwidth parts are configured may be configured to be partly or entirely overlapped with each other. In this regard, when frequency-axis units of 6 RBs are not aligned, a blocking probability may undesirably increase. Accordingly, the disclosure provides a method of effectively allocating frequency-axis resources for a CORESET. Some embodiments of the disclosure may include a method of using a common RB index, a method of additionally signaling a starting RB on a frequency-axis, or the like.

According to some embodiments, in 5G, a minimum unit of a resource to transmit a DL control channel may be defined as a control channel element (CCE). One CCE may be composed of 6 Resource Element Groups (REGs), and one REG may be composed of 12 Resource Elements (REs). Also, a plurality of REGs may be grouped to constitute one REG bundle. The disclosure may provide a method of mapping, to a physical resource, DL control information that is channel coded and Quadrature Phase Shift Keying (QPSK) modulated. Some embodiments of the disclosure may include at least one of methods including a mapping method performed in one or more CCE units corresponding to Aggregation Levels, a mapping method performed in a CCE unit, a mapping method performed in a REG bundle unit, and a mapping method performed in a REG unit.

By using a method of transmitting and receiving a DL control channel proposed in the disclosure, a blocking probability that may occur in transmission of a DL control channel may be effectively controlled, and diversity and interleaving effects may be additionally achieved. Also, in the disclosure, a control channel may indicate at least one of a control channel itself, control information, and a control signal. The control channel, the control information, and the control signal may have a same meaning or different meanings.

Hereinafter, a frame structure of LTE and LTE-A systems will now be described in detail with reference to drawings.

FIG. 1 illustrates a basic structure of a time-frequency domain in an LTE system or a system similar thereto, according to some embodiments.

Referring to FIG. 1, a horizontal axis of a radio resource domain represents a time domain and a vertical axis represents a frequency domain. A minimum transmit unit in the time domain may be an OFDM symbol, in which $N_{symb}$ OFDM symbols 101 may be gathered to constitute one slot 102, and two slots may be gathered to constitute one subframe 103. In this regard, a length of the slot 102 may be 0.5 ms, and a length of the subframe 103 may be 1.0 ms. Also, a radio frame 104 may be a time domain unit including 10 subframes. A minimum transmit unit in the frequency domain may be a subcarrier, and a transmission bandwidth of an entire system transmission bandwidth may include $N_{sc}^{BW}$ subcarriers 105 in total. A basic unit of a resource in the time-frequency domain may be an RE 106 and may be expressed as an OFDM symbol index and a subcarrier index. A RB 107 or a physical resource block (PRB) may be defined as $N_{symb}$ successive OFDM symbols 101 in the time domain and $N_{sc}^{RB}$ successive subcarriers 108 in the frequency domain. Therefore, one RB 108 may include $N_{symb} \times N_{RB}$ REs 106. In general, a minimum transmit unit of data may be a RB unit. In the LTE system, $N_{symb}=7$ and $N_{RB}=12$, and $N_{BW}$ and $N_{RB}$ may be proportional to a bandwidth of a system transmission band. However, particular values described above may be changed according to systems.

Next, Downlink Control Information (DCI) in the LTE and LTE-A systems will now be described in detail.

According to some embodiments, in the LTE system, scheduling information about DL data or UL data may be transferred from a base station to a UE through DCI. According to some embodiments, the DCI may be defined according to various formats, and a DCI format may be used, the DCI format being determined according to whether the DCI is scheduling information (UL grant) about UL data, is scheduling information (DL grant) about DL data, or is compact DCI having small-size control information, applies spatial multiplexing using multiple antennas, and is DCI for power control. For example, DCI format 1, which is scheduling control information about DL data, may include at least one of a plurality of pieces of following control information.

Resource allocation type 0/1 flag: indicates whether a resource allocation type is Type 0 or Type 1. For Type 0, a resource is allocated in a resource block group (RBG) unit by applying a bitmap scheme thereto. In the LTE system, a basic unit of scheduling is a RB expressed in time and frequency domain resources, and a RBG composed of a plurality of RBs is a basic unit of scheduling for Type 0. Type 1 allows a particular RB in the RBG to be allocated.

Resource block assignment: indicates a RB allocated to data transmission. Representation of a resource is determined according to a system bandwidth and a resource allocation scheme.

Modulation and coding scheme (MCS): indicates a modulation scheme used in data transmission and a size of a transport block (TB) that is data to be transmitted.

HARQ process number: indicates a process number of HARQ.

New data indicator: indicates whether first transmission or re-transmission of HARQ.

Redundancy version: indicates a redundancy version of HARQ.

Transmit power control (TPC) command for physical uplink control channel (PUCCH): indicates a TPC command with respect to a PUCCH that is UL control channel.

According to some embodiments, the DCI may be transmitted via a Physical Downlink Control Channel (PDCCH) that is a DL physical control channel or an Enhanced PDCCH (EPDCCH) after passing through a channel coding and modulation process.

According to some embodiments, a Cyclic Redundancy Check (CRC) may be added to a payload of a DCI message. According to some embodiments, the CRC may be scrambled by a Radio Network Temporary Identifier (RNTI) corresponding to an identity of the UE. Different RNTIs may be used according to purposes of the DCI message which are transmission of UE-specific data, a power control command, a random access response, or the like. That is, the RNTI may not be explicitly transmitted but may be transmitted being included in a CRC calculation process. When the UE receives the DCI message transmitted via the PDCCH, the UE may check the CRC by using the allocated RNTI. As a result of the checking, when the CRC is correct, the UE may recognize that the message is transmitted to the UE.

Figure 2:
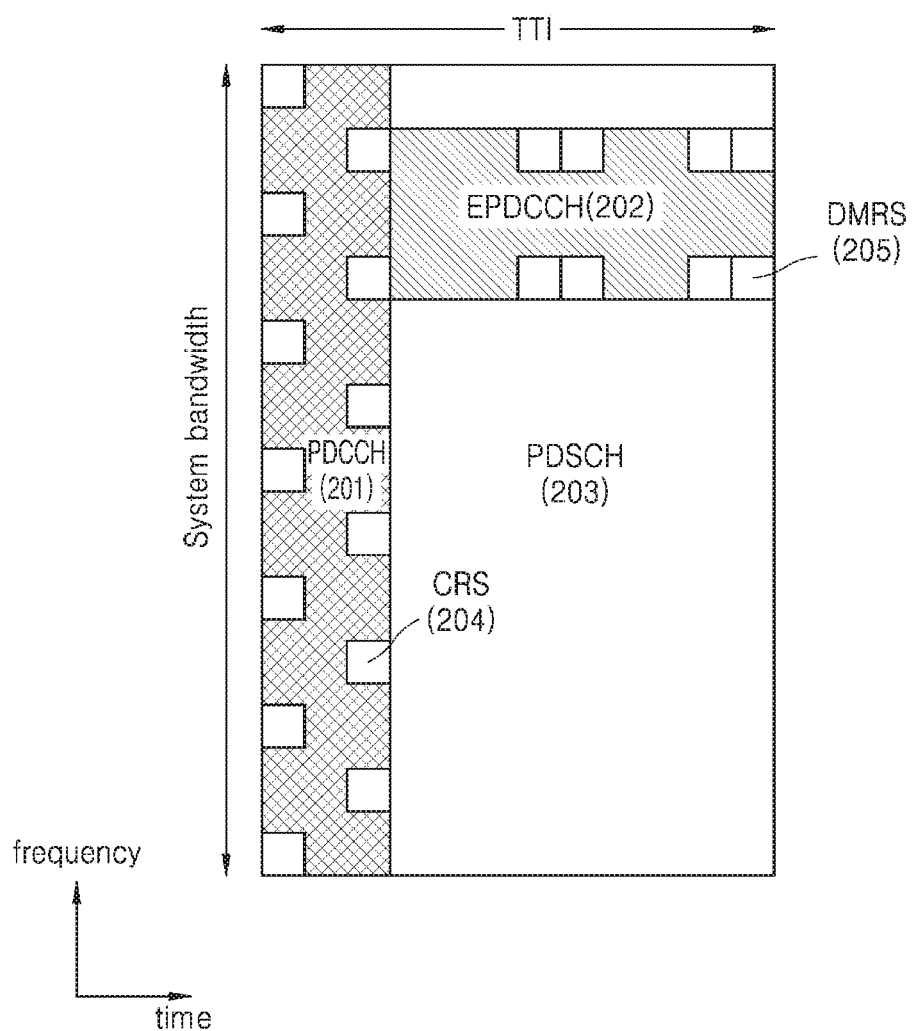
FIG. 2 illustrates a downlink (DL) control channel in an LTE system or a system similar thereto, according to some embodiments.

FIG. 2 illustrates a DL control channel in an LTE system or a system similar thereto, according to some embodiments.

Referring to FIG. 2, a PDCCH 201 and an EPDCCH 202 that are DL physical channels in which DCI of the LTE is transmitted are illustrated. Referring to FIG. 2, the PDCCH 201 is time-multiplexed with a physical downlink shared channel (PDSCH) 203, which is a data transmission channel, and is transmitted over an entire system bandwidth. A region of the PDCCH 201 is represented as an OFDM symbol number that may be indicated to the UE by using a Control Format Indicator (CFI) transmitted via a Physical Control Format Indicator Channel (PCFICH). Because the PDCCH 201 is allocated to an OFDM symbol positioned at the front of a subframe, the UE may decode DL scheduling allocation as soon as possible, and by doing so, decoding delay with respect to a Downlink Shared Channel (DL-SCH), i.e., overall DL transmission delay may be decreased. One PDCCH may transport one DCI message, and because a plurality of UEs may be simultaneously scheduled in a DL and an UL, transmission of a plurality of PDCCHs may simultaneously occur in each cell. A Cell-Specific Reference Signal (CRS) 204 may be used as a reference signal for decoding of the PDCCH 201. The CRS 204 may be transmitted via every subframe over an entire band, and scrambling and resource mapping therefor may vary according to cell identities (IDs). The CRS 204 is a reference signal to be commonly used by all UEs, and thus UE-specific beamforming cannot be used therefo. Therefore, a multi-antenna transmission technique for a PDCCH of the LTE may be limited to open-loop transmit diversity. However, the disclosure is not limited to the examples. The number of ports of a CRS may be implicitly indicated to the UE via decoding of a Physical Broadcast Channel (PBCH).

According to some embodiments, resource allocation of the PDCCH 201 may be based on CCEs, and one CCE may be composed of 9 REGs, and one REG may be composed of 36 REs. However, the disclosure is not limited to the examples. A CCE number for the particular PDCCH 201 may be 1, 2, 4, or 8, and may vary according to a channel coding rate of a payload of a DCI message. However, the disclosure is not limited to the examples. Different CCE numbers may be used to implement link adaptation of the PDCCH 201. The UE has to detect a signal without having information about the PDCCH 201, and in the LTE, a search space indicating a set of CCEs is defined for blind decoding. The search space is configured as a plurality of sets in an Aggregation Level (AL) of each CCE, and may not be explicitly signaled but may be implicitly defined via a function and a subframe number according to an ID of the UE. In each subframe, the UE performs decoding on the PDCCH 201 with respect to all available resource candidate sets that may be generated from CCEs in a configured search space, and processes information declared to be valid to the UE via CRC checking.

According to some embodiments, the search space may be classified to a UE-specific search space and a common search space. UEs in a certain set or all UEs may detect a common search space of the PDCCH 201 so as to receive cell-common control information such as dynamic scheduling about system information or a paging message. For example, scheduling allocation information of a DL-SCH for transmission of System Information Block (SIB)-1 including business information of a cell may be received by detecting the common search space of the PDCCH 201.

Referring to FIG. 2, the EPDCCH 202 may be frequency-multiplexed with the PDSCH 203 and be transmitted. A BS may appropriately allocate resources of the EPDCCH 202 and the PDSCH 203 via scheduling, and thus may effectively support existence with data transmission for a legacy LTE terminal. However, the EPDCCH 202 is allocated to one entire subframe at a time axis and then is transmitted, such that there is a problem of damage in a transmission delay time. A plurality of EPDCCHs 202 constitute one set of EPDCCH 202, and allocation of the set of EPDCCH 202 is performed in a PRB pair. Position information about the set of EPDCCH 202 is configured to be UE-specific and is signaled via RRC. Maximum two sets of EPDCCH 202 may be configured for each UE, and one set of EPDCCH 202 may be multiplexed and simultaneously configured for different UEs.

According to some embodiments, resource allocation of the EPDCCH 202 may be based on Enhanced CCEs (ECCEs), and one ECCE may be composed of 4 or 8 Enhanced REGs (EREGs), and the number of EREGs per one ECCE may vary according to a Cyclic Prefix (CP) length and subframe configuration information. One EREG may be composed of 9 REs, and thus, 16 EREGs may be present per a PRB pair. However, the disclosure is not limited to the examples. Also, an EPDCCH transmission scheme may be classified into localized and distributed transmissions according to mapping methods for REs of a REG. An aggregation level of an ECCE may be 1, 2, 4, 8, 16, or 32, and may be determined based on a CP length, subframe configuration, an EPDCCH format, and a transmission scheme.

According to some embodiments, the EPDCCH 202 may support only a UE-specific search space. Therefore, a UE attempting to receive a system message must monitor a common search space on the existing PDCCH 201.

According to some embodiments, a Demodulation Reference Signal (DMRS) 205 may be used as a reference signal for decoding of the EPDCCH 202. Therefore, a BS may configure precoding with respect to the EPDCCH 202, and may use UE-specific beamforming. Even when UEs do not know which precoding has been used, the UEs may perform decoding on the EPDCCH 202, according to the DMRS 205. The EPDCCH 202 may use a same pattern as a DMRS of the PDSCH 203. However, unlike to the PDSCH 203, the DMRS 205 in the EPDCCH 202 may support transmission using maximum 4 antenna ports. The DMRS 205 is transmitted only in a PRB where an EPDCCH is transmitted.

According to some embodiments, port configuration information of the DMRS 205 may vary according to a transmission scheme of the EPDCCH 202. In the localized transmission scheme, an antenna port corresponding to an ECCE to which the EPDCCH 202 is mapped may be selected based on ID of a UE. When different UEs share a same ECCE, i.e., when multi-user MIMO transmission is used, DMRS antenna ports may be allocated to the UEs, respectively. Alternatively, transmission may be performed by sharing the DMRS 205, and in this case, the DMRS 205 may be identified by scrambling sequences configured via higher layer signaling. In the distributed transmission scheme, maximum two antenna ports are supported for the DMRS 205, and a diversity scheme of a precoder cycling technique is supported. The DMRS 205 may be shared in all REs transmitted in one PRB pair.

According to some embodiments, in the LTE, an entire PDCCH region is composed of a set of CCEs in a logical domain, and has a search space including a set of CCEs. The search space may be classified to a common search space and a UE-specific search space, and a search space with respect to a PDCCH in the LTE may be defined as below.

---

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by
$L \{(Y_k + m') \bmod \lfloor N_{CCE,k}/L \rfloor\} + i$
where $Y_k$ is defined below, $i = 0, L, L - 1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, L, M^{(L)} - 1$. $M^{(L)}$ is the number of PDCCH candidates to monitor in the given search space.
Note that the carrier indicator field value is the same as ServCellIndex
For the common search spaces, $Y_k$ is set to 0 for the two aggregation levels $L = 4$ and $L = 8$.
For the UE-specific search space $S_k^{(L)}$ at aggregation level L. the variable $Y_k$ is defined by
$Y_k = (A \cdot Y_{k-1}) \bmod D$
Where $Y_{-1} = n_{RNTI} \neq 0$, $A = 39827$, $D = 65537$ and $k = \lfloor n_s/2 \rfloor$, $n_s$ is the slot number within a radio frame.
The RNTI value used for $n_{RNTI}$ is defined in subclause 7.1 in downlink and subclause 8 in uplink.

---

According to the definition of a search space with respect to PDCCH described above, the UE-specific search space may not be explicitly signaled but may be implicitly defined via a function and a subframe number according to an ID of a UE. In other words, because the UE-specific search space is changeable according to a subframe number, this means that the UE-specific search space is changeable according to time, and by using this, a problem (hereinafter, it is defined as a blocking problem) in which a particular UE among UEs cannot use a search space due to other UEs may be solved. In a case where a certain UE cannot be scheduled in a certain subframe because other UEs scheduled in the certain subframe already use all CCEs monitored by the certain UE, because such a search space is changed according to time, the problem may not occur in a next subframe. For example, even when a part of a UE-specific search space overlaps in UE #1 and UE #2 in a particular subframe, because a UE-specific search space is changed according to each subframe, it is possible to predict that an overlap in a next subframe may be different.

According to some embodiments, according to the definition of a search space with respect to PDCCH described above, in a case of a common search space, UEs in a certain set or all UEs have to receive a PDCCH, such that the common search space is defined as a predefined set of CCEs. In other words, the common search space may not be changed according to an ID of a UE or a subframe number. Even when the common search space exists for transmission of various system messages, the common search space may be used to transmit control information of each UE. By doing so, the common search space may be even used as a solution for a problem in which a UE cannot be scheduled due to shortage of available resources in a UE-specific search space.

According to some embodiments, a search space may correspond to a set of candidate control channels composed of CCEs for which a UE has to attempt to decode on a given aggregation level. Because there are various aggregation levels in which 1, 2, 4 or 8 CCEs constitute one set, a UE may have a plurality of search spaces. In LTE PDCCH, the number of PDCCH candidates in a search space defined according to an aggregation level, the number of PDCCH candidates to be monitored by a UE, is defined in Table below.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to [Table 1], in a UE-specific search space, aggregation levels {1, 2, 4, 8} may be supported and may have {6, 6, 2, 2} PDCCH candidates, respectively. In a common search space 302, aggregation levels {4, 8} may be supported and may have {4, 2} PDCCH candidates, respectively. The reason why the common search space supports only aggregation levels {4, 8} is to improve a coverage feature because, in general, a system message has to reach a cell boundary.

According to some embodiments, DCI transmitted in a common search space may be defined only for a particular DCI format such as 0/1A/3/3A/1C that correspond to purposes including a system message or a power control with respect to a UE group. The common search space may not support a DCI format having spatial multiplexing. However, the disclosure is not limited to the examples. A DL DCI format to be decoded in a UE-specific search space may vary according to a transmission mode configured for a certain UE. Configuration of the transmission mode is performed via RRC signaling, such that an exact subframe number is not defined with respect to whether the configuration is effective for the certain UE. Therefore, regardless of the transmission mode, the certain UE may constantly perform decoding on DCI format 1A so as not to lose communication.

In the above, a method of transmitting and receiving a DL control channel and DL control information and search spaces in the LTE and LTE-A have been described. Hereinafter, a DL control channel in the 5G communication system will now be described in detail with reference to drawings.

Figure 3:
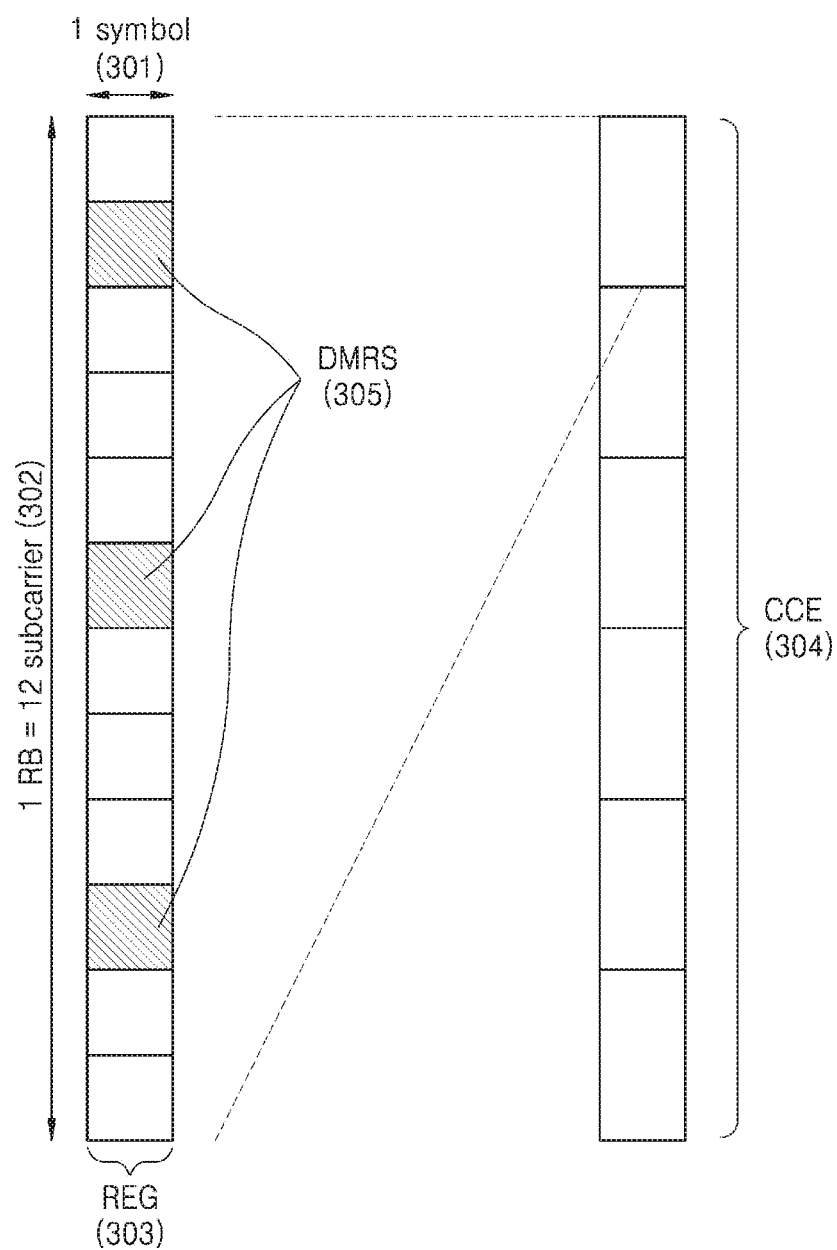
FIG. 3 illustrates transmission resources of a DL control channel in a $5^{th}$ (5G) system or a system similar thereto, according to some embodiments.

FIG. 3 illustrates transmission resources of a DL control channel in the 5G system or a system similar thereto, according to some embodiments. Referring to FIG. 3, basic units (REG) of time and frequency resources constituting a control channel are one OFDM symbol 301 at a time axis and are 12 subcarriers 302, i.e., one RB, at a frequency axis. When configuring a basic unit of a control channel, a basic unit at a time axis is assumed to be one OFDM symbol 301, such that a data channel and a control channel may be time-multiplexed within one subframe. Because the control channel is positioned before the data channel, a processing time of a user may be decreased such that it is easy to satisfy delay time requirements. A basic unit at a frequency axis of the control channel is configured to be one RB 302, such that frequency multiplexing between the control channel and the data channel may be further efficiently performed.

By concatenating a REG 303 shown in FIG. 3, control channel regions having various sizes may be configured. For example, in a case where a basic unit to which a DL control channel is allocated is a CCE 304, one CCE 304 may be composed of a plurality of REGs 303. Describing the REG 303 shown in FIG. 3, the REG 303 may be composed of 12 REs, and in a case where one CCE 304 is composed of 6 REGs 303, this means that one CCE 304 may be composed of 72 REs. When a DL CORESET is configured, the CORESET may be composed of a plurality of CCEs 304, and a particular DL control channel may be mapped to one or more CCEs 304 according to an aggregation level (AL) in the CORESET and be transmitted. The CCEs 304 in the CORESET are identified by numbers, and in this regard, the numbers may be allocated according to a logical mapping scheme.

The basic unit of the DL control channel shown in FIG. 3, i.e., the REG 303, may include all regions where REs to which DCI is mapped and DMRSs 305 that are reference signals for decoding them are mapped. As shown in FIG. 3, the DMRS 305 may be transmitted in three REs in one REG 303.

Figure 4:
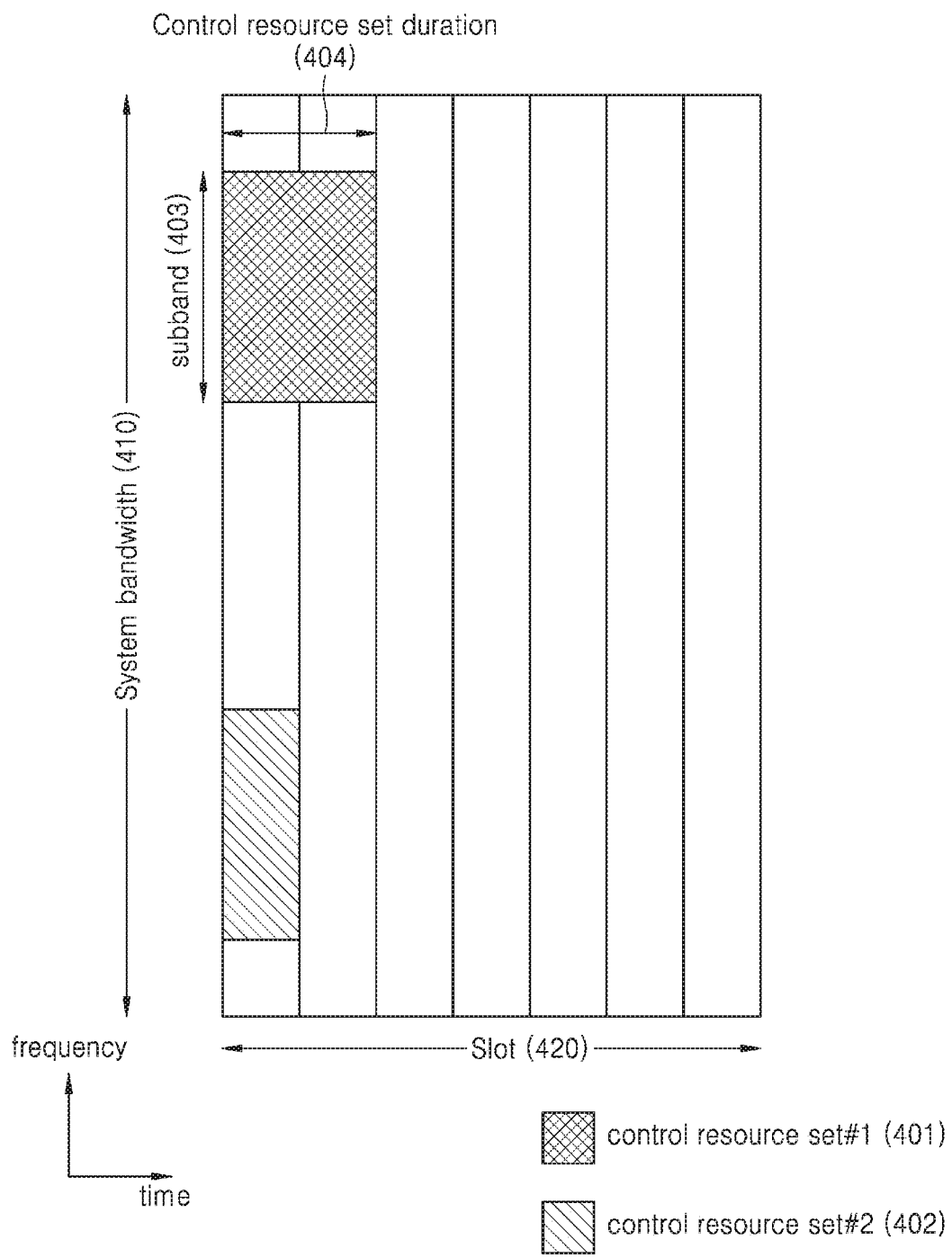
FIG. 4 is a diagram for describing configuration with respect to a CORESET in the 5G system or a system similar thereto, according to some embodiments.

FIG. 4 is a diagram for describing configuration with respect to a CORESET in the 5G system or a system similar thereto, according to some embodiments. FIG. 4 illustrates an example of a CORESET in which a DL control channel is transmitted in the 5G wireless communication system, and in the example, two CORESETs (Control Resource Set #1 401 and Control Resource Set #2 402) are configured in a system bandwidth 410 at a frequency axis and one slot 420 at a time axis (in the example of FIG. 4, it is assumed that one slot is composed of 7 OFDM symbols). CORESETs 401 and 402 may be configured as a particular subband 403 in the entire system bandwidth 410 at the frequency axis. At the time axis, one or more OFDM symbols may be configured, and may be defined as control resource set duration 404. In the example of FIG. 4, Control Resource Set #1 401 is configured as a control resource set length of two symbols, and Control Resource Set #2 402 is configured as a control resource set length of one symbol.

A BS may configure CORESET in 5G described above to a UE via higher layer signaling (e.g., system information, master information block (MIB), RRC signaling). Configuring CORESET to the UE may mean that information such as a position of CORESET, a subband, resource allocation of CORESET, CORESET length, or the like is provided. For example, a plurality of pieces of information of Table 2 below may be included.

TABLE 2

Configuration information 1. RB allocation information at frequency axis
Configuration information 2. CORESET start symbol
Configuration information 3. CORESET symbol length
Configuration information 4. Size of REG bundling (2, 3, or 6)
Configuration information 5. Transmission mode (interleaved transmission TABLE 2-continued mode or non-interleaved transmission mode)
Configuration information 6. DMRS configuration information (precoder granularity)
Configuration information 7. Search space type (common search space, group-common search space, UE-specific search space)
Configuration information 8. DCI format to be monitored in corresponding CORESET
ETC.

The disclosure is not limited to the examples, and various information as well as the configuration information necessary for transmission of a DL control channel may be configured in a UE.

When a BS indicates the UE of RB allocation information at a frequency axis in the configuration information for CORESET, resource allocation type 0 may be used. Resource allocation type 0 may mean a method by which RBs allocated on the frequency axis are indicated by using a bitmap. In this regard, respective RBs in a frequency domain are not directly indicated but sequential RBs are clustered as a group, and the group (called a RBG) is indicated. When allocation information is indicated to CORESET, a size of the RBG may be 6 RBs. That is, a configuration by a bitmap scheme in a RBG unit of 6 RBs may be indicated. However, the disclosure is not limited to the examples.

Hereinafter, a bandwidth part configuring method being considered in the 5G communication system will now be described.

Figure 5:
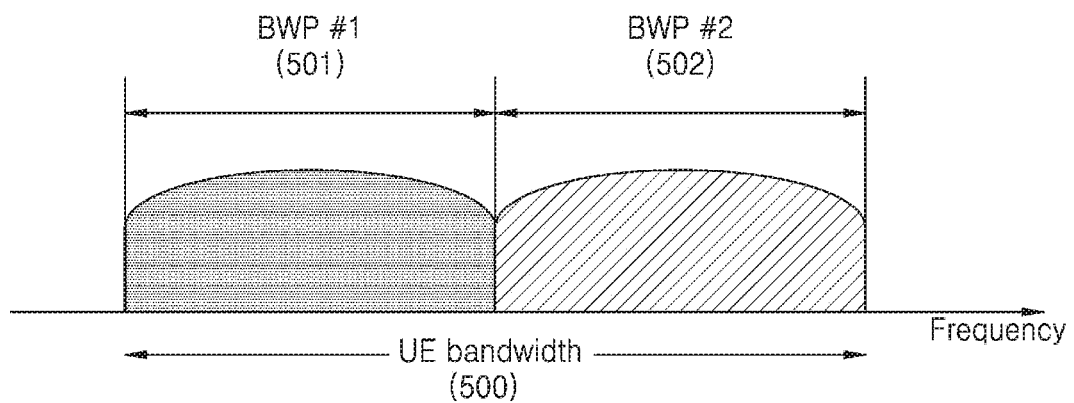
FIG. 5 is a diagram for describing configuration of a bandwidth part in the 5G system or a system similar thereto, according to some embodiments.

FIG. 5 is a diagram for describing configuration of a bandwidth part in the 5G system or a system similar thereto, according to some embodiments. Referring to FIG. 5, it is illustrated that a UE bandwidth 500 is configured as two bandwidth parts that are bandwidth part #1 (BWP #1) 501 and bandwidth part #2 (BWP #2) 502. ABS may configure one or more bandwidth parts to a UE, and may configure information below with respect to each of the bandwidth parts.

TABLE 3

Configuration information 1. Bandwidth of bandwidth part (number of PRBs constituting bandwidth part)
Configuration information 2. Frequency position of bandwidth part (offset value compared to reference point, and reference point may correspond to PRB#0 that is first PRB index of common PRB index)
Configuration information 3. Numerology of bandwidth part (e.g., subcarrier spacing, a CP length, etc.)
ETC.

However, the disclosure is not limited to the examples, and various parameters as well as the configuration information related to the bandwidth part may be configured to the UE.

The BS may provide the information to the UE via higher layer signaling, e.g., RRC signaling. At least one bandwidth part from among the one or more configured bandwidth parts may be activated. Activation or deactivation with respect to a configured bandwidth part may be semi-statically provided from the BS to the UE via RRC signaling or may be dynamically provided via MAC CE or DCI.

Configuration of bandwidth parts supported by 5G may be used for various purposes.

According to some embodiments, in a case where a bandwidth supported by a UE is narrower than a system bandwidth, bandwidth part configuration may support this problem. For example, in [Table 3], a frequency position of a bandwidth part (Configuration information 2) is configured to the UE, such that the UE may transmit or receive data at a particular frequency position within the system bandwidth.

According to some embodiments, the BS may configure a plurality of bandwidth parts to the UE so as to support different numerologies. For example, to support both data transmission and reception using subcarrier spacing of 15 kHz and subcarrier spacing of 30 kHz, two bandwidth parts may be configured as subcarrier spacings of 15 kHz and 30 kHz. Different bandwidth parts may be frequency division multiplexed, and in a case where data is to be transmitted and received in particular subcarrier spacing, a bandwidth part configured as the particular subcarrier spacing may be activated.

According to some embodiments, the BS may configure bandwidth parts having different bandwidths to the UE so as to reduce power consumption in the UE. For example, in a case where the UE supports a very large bandwidth, e.g., a bandwidth of 100 MHz, and data is always transmitted and received via the bandwidth, very high power consumption may occur. In particular, even when there is no traffic, when monitoring is performed on an unnecessary DL control channel via the large bandwidth of 100 MHz, this may be very inefficient in terms of power consumption. To reduce power consumption in the UE, the BS may configure a bandwidth of a relatively small bandwidth, e.g., a bandwidth part of 20 MHz, to the UE. In a situation without traffic, the UE may perform a monitoring operation in the bandwidth part of 20 MHz, and when data occurs, the UE may transmit and receive data via the bandwidth of 100 MHz according to indication by the BS.

According to some embodiments, a method by which the BS configures a bandwidth part to the UE may be based on a common PRB index. The common PRB index may be defined as a PRB index that is commonly shared between all UEs in a certain cell. A position of PRB #0 corresponding to a first index of the common PRB index may be notified to the UE from the BS via higher layer signaling. For example, the BS may indicate a value of offset between a lowest PRB index of a synchronization signal block and PRB #0 to the UE via higher layer signaling, e.g., system information (SI) or RRC signaling. All UEs may recognize same PRB #0. The BS may configure, based on the common PRB index, a frequency position (a value of offset from PRB #0) of a bandwidth part and a bandwidth of the bandwidth part (the number of PRBs constituting the bandwidth part) which are to be configured to each UE.

Figure 6:
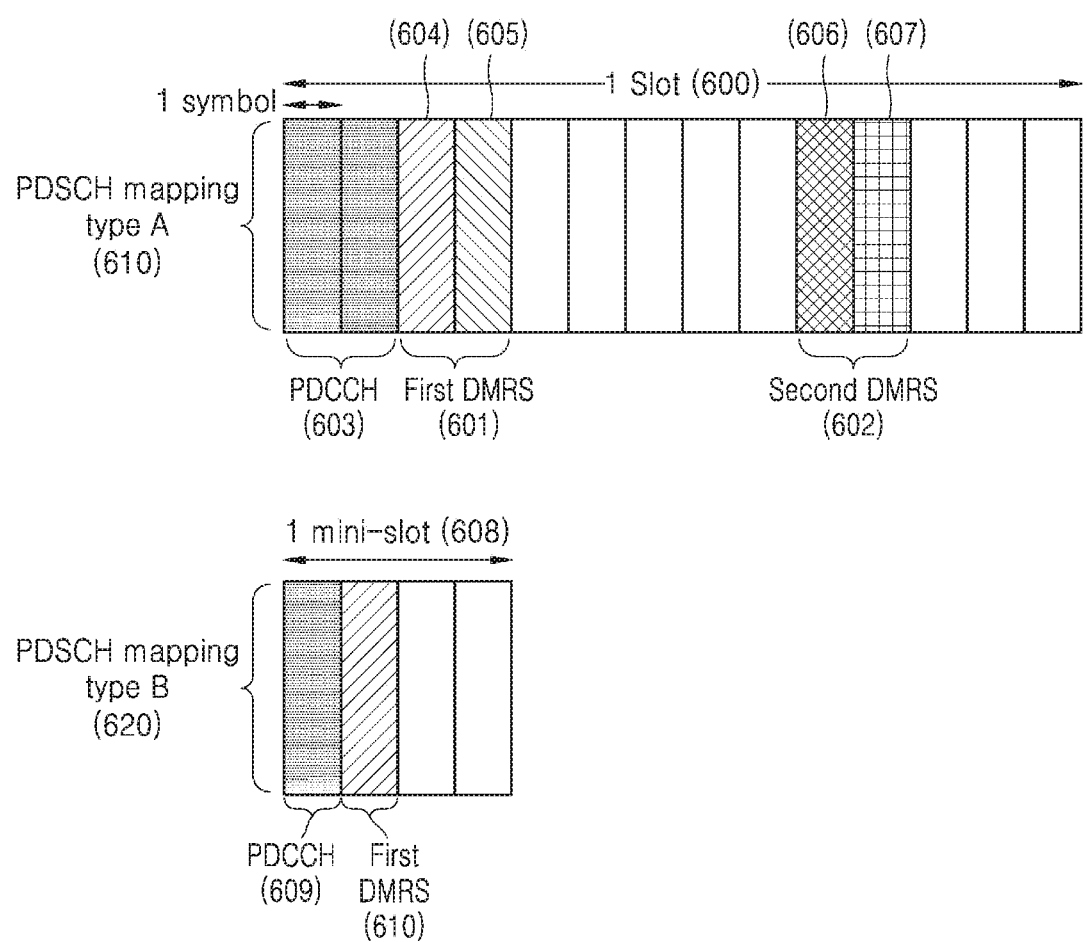
FIG. 6 is a diagram for describing a slot and mini-slot scheduling in the 5G system or a system similar thereto, according to some embodiments.

FIG. 6 is a diagram for describing a slot and mini-slot scheduling in the 5G system or a system similar thereto, according to some embodiments.

Referring to FIG. 6, a PDSCH scheduling method and a DMRS transmitting method therefor which are considered in the 5G communication system are illustrated. Referring to FIG. 6, a position of a DMRS in the 5G communication system may vary according to mapping types of a PDSCH. PDSCH mapping type A 610 in FIG. 6 may correspond to slot-based scheduling, and PDSCH mapping type B 620 may correspond to non-slot-based or mini slot-based scheduling. The term "mini slot" may be interchangeably used with the term "sub slot". The slot-based scheduling may correspond to a scheme by which a PDSCH is scheduled over one slot 600, and the non-slot-based or mini slot-based scheduling may correspond to a scheme by which the PDSCH is scheduled over a mini-slot 608 configured as a particular number of symbols.

Referring to FIG. 6, the 5G communication system may support two DMRSs, that are, a First DMRS 601 (also referred to as a first DMRS or a front loaded DMRS) and a Second DMRS 602 (also referred to as a second DMRS or an additional DMRS). The First DMRS 601 was introduced to 5G so as to decrease a processing time because the First DMRS 601 facilitates fast channel estimation when the PDSCH is decoded. The Second DMRS 602 was introduced to 5G so as to improve channel estimation performance and to compensate for and track a phase distortion in a UE that moves very fast. At least the First DMRS 601 may be transmitted to decode the PDSCH, and the Second DMRS 602 may be additionally transmitted according to a configuration by a BS. The Second DMRS 602 may be repeatedly transmitted with a same pattern as the First DMRS 601. A position of a symbol in which the First DMRS 601 is to be transmitted may vary according to mapping types of the PDSCH. When it is PDSCH mapping type A 610, the First DMRS 601 may be transmitted in a third OFDM symbol (or a fourth OFDM symbol). When it is PDSCH mapping type B 620, the First DMRS 601 may be transmitted in a first OFDM symbol of a resource that is scheduled for the PDSCH. A position of a symbol in which the Second DMRS 602 is to be transmitted is still in discussion, and for example, the Second DMRS 602 may be transmitted in a fixed OFDM symbol, may be configured by the BS, or may be indicated to the UE via DCI.

Referring to FIG. 6, an example is shown in which, when it is PDSCH mapping type A 610, the First DMRS 601 is transmitted in a third OFDM symbol 604 and a fourth OFDM symbol 605, and the Second DMRS 602 is transmitted in a tenth OFDM symbol 606 and an eleventh OFDM symbol 607.

According to some embodiments, in 5G, each UE may be configured, via RRC signaling, with a CORESET that is time and frequency resources in which a DL control channel can be transmitted. In this regard, a base station may indicate a UE of frequency-axis resource allocation with respect to the CORESET through a bitmap of a 6 RB unit. CORESETs of UEs with which different bandwidth parts are configured may be configured to be partly or entirely overlapped with each other. In this regard, when frequency-axis units of 6 RBs are not aligned, a blocking probability may undesirably increase. Accordingly, the disclosure provides a method of effectively allocating frequency-axis resources for a CORESET. The disclosure may include a method of using a common RB index, a method of additionally signaling a start RB at a frequency-axis, or the like.

In 5G, a minimum unit of a resource to transmit a DL control channel may be defined as a CCE. One CCE may be composed of 6 REGs, and one REG may be composed of 12 REs. Also, a plurality of REGs may be grouped to constitute one REG bundle. However, the disclosure is not limited to the examples. The disclosure may provide a method of mapping, to a physical resource, DL control information that is channel coded and QPSK modulated. The provided method may include at least one of methods including a mapping method performed in one or more CCE units corresponding to Aggregation Levels, a mapping method performed in a CCE unit, a mapping method performed in a REG bundle unit, and a mapping method performed in a REG unit.

Hereinafter, an embodiment of the disclosure will now be described in detail with drawing. Hereinafter, the embodiment may be described with reference to the LTE or LTE-A system, but the embodiment of the disclosure may be applied to other communication systems having similar technical backgrounds or channel forms. For example, the other communication systems may include the 5G NR communication technology developed after LTE-A. Therefore, embodiments of the disclosure may be applied to other communication systems through modification at the discretion of one of ordinary skill in the art without greatly departing from the scope of the disclosure.

In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms should be understood based on the entire description of the present specification.

Figure 7:
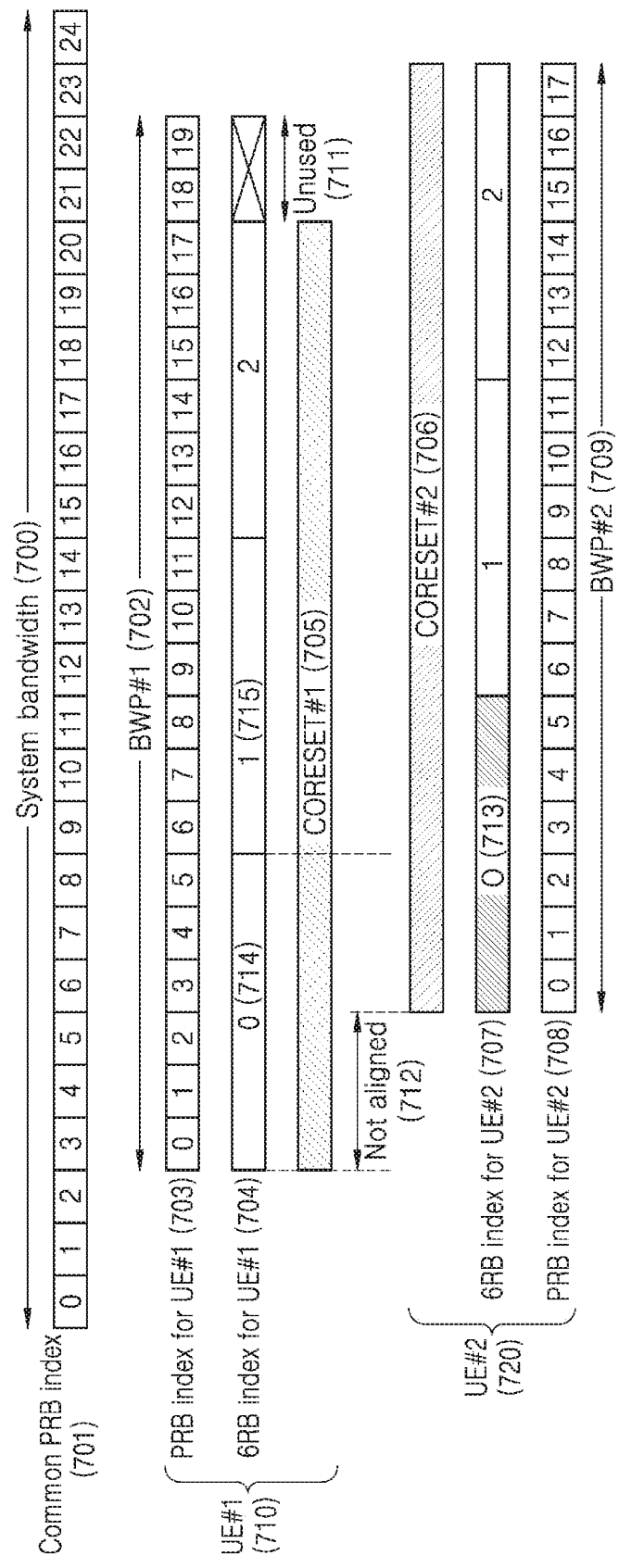
FIG. 7 illustrates an example of a configuration of bandwidth parts and CORESETs, according to some embodiments.

FIG. 7 illustrates an example of a configuration of bandwidth parts and CORESETs, according to some embodiments.

According to some embodiments, a BS may configure one or more bandwidth parts to a UE via higher layer signaling. As described above, a bandwidth part may be configured as a particular bandwidth of a particular frequency position in an entire system transmission bandwidth 700, and a configuration about the bandwidth part may be based on a common PRB index 701.

FIG. 7 illustrates an example in which the BS configures bandwidth part #1 702 and bandwidth part #2 709 to UE #1 710 and UE #2 720, respectively. In the example of FIG. 7, UE #1 710 is configured with a bandwidth part whose frequency position is at PRB #3 with reference to the common PRB index 701 and whose bandwidth corresponds to 20 RBs, and UE #2 720 is configured with a bandwidth part whose frequency position is at PRB #6 with reference to the common PRB index 701 and whose bandwidth corresponds to 18 RBs. A configuration of a bandwidth part may be performed in one RB unit.

The BS may configure at least one CORESET for each of bandwidth parts configured to the UE. That is, CORESETs X may be configured for bandwidths X. In the example of FIG. 7, the BS configures CORESET #1 705 in bandwidth part #1 702 configured in UE #1 710, CORESET #1 705 being to be monitored by UE #1, and the BS configures CORESET #2 706 in bandwidth part #2 709 configured in UE #2 720, CORESET #2 706 being to be monitored by UE #2. Hereinafter, various embodiments by which the BS configures, to the UE, a CORESET in each bandwidth part may be provided.

According to some embodiments, the BS may indicate, via higher layer signaling, frequency resource allocation information about a CORESET based on a PRB index in a bandwidth part configured in the UE. In this regard, the BS may perform indication by using a bitmap scheme based on a 6 RB unit. In this regard, when the number of RBs in the configured bandwidth part is $N_{RB,BWP}$, a size P (in CORESET allocation, P=6) of a RB group may be indicated by using Method 1 or Method 2 below.

[Method 1]
  Bitmap of ceil($N_{RB,BWP}/P$) bits
  ceil(x) corresponds to a function for outputting a smallest value from among integers equal to or greater than x

[Method 2]
  Bitmap of floor($N_{RB,BWP}/P$) bits may be indicated
  floor(x) corresponds to a function for outputting a largest value from among integers equal to or smaller than x When using [Method 1] above, all RBs of a bandwidth part, i.e., $N_{RB,BWP}$ RBs, may be all used in CORESET allocation.

When using [Method 2] above, mod($N_{RB,BWP}$,P) RBs from among all RBs of the bandwidth part, i.e., $N_{RB,BWP}$ RBs, may not be used. In this regard, mod(X,Y) may correspond to a modular function for outputting a result obtained by dividing X by Y.

Referring to FIG. 7, when the BS indicates frequency resource allocation information about CORESET #1 705 to UE #1 710, the BS may calculate 6 RB index 704 based on PRB index 703 about bandwidth part #1 702, and may indicate, based on the calculation, frequency allocation information of CORESET #1 705 by using a bitmap. In the example of FIG. 7, the number of RBs of bandwidth part #1 702 is $N_{RB,BWP}$=20, and when assuming using [Method 2] above, frequency allocation information of a CORESET may be indicated by using a bitmap of floor($N_{RB,BWP}$/P)=3 bits. In the example of FIG. 7, 6 RB set corresponding to 0, 1, 2 with reference to 6 RB index 704 is configured as CORESET #1 705. Here, because [Method 2] is used, a RB 711 that is not used may exist.

Equally, when the BS indicates frequency resource allocation information about CORESET #2 706 to UE #2 720, the BS may calculate 6 RB index 708 based on PRB index 707 about bandwidth part #2 709, and may indicate, based on the calculation, frequency allocation information of CORESET #2 706 by using a bitmap. In the example of FIG. 7, the number of RBs of bandwidth part #2 709 is $N_{RB,BWP}$=18, and when assuming using [Method 2] above, frequency allocation information of a CORESET may be indicated by using a bitmap of floor($N_{RB,BWP}$/P)=3 bits. In the example of FIG. 7, 6 RB set corresponding to 0, 1, 2 with reference to 6 RB index 708 is configured as CORESET #2 706.

The UE may receive, from the BS, a CORESET configuration based on a PRB index in a bandwidth part configured to the UE, and may receive DL control information in the configured CORESET.

According to the embodiment of FIG. 7, a signaling overhead required in a configuration of frequency allocation information about a CORESET may be minimized.

However, when CORESETs configured to different UEs overlap on a frequency axis, a 6 RB grid of the overlapped CORESETs may not be aligned. Referring to FIG. 7, CORESET #1 705 of UE #1 710 and CORESET #2 706 of UE #2 720 are not aligned. FIG. 7 illustrates spacing 712 that is not aligned. When the 6 RB grid is not aligned, a blocking probability in transmission of DL control information may be increased. Blocking may refer to a situation where restriction on transmission of DL control information occurs because certain DL control information is mapped to a particular resource and then is transmitted. For example, in FIG. 7, when CORESETs 705 and 706 are each composed of 1 symbol, a CCE may be composed of 6 RBs. When DL control information for UE #2 720 is transmitted in $0^{th}$ 6 RB 713 of CORESET #2 706, DL control information for UE #1 710 cannot be transmitted in $0^{th}$ 6 RB 714 and $1^{st}$ 6 RB 715 of CORESET #1 705 of UE #1 710. That is, when the 6 RB grid is not aligned, the blocking probability may be increased. Hereinafter, with respect to a method by which a BS configures frequency allocation to different CORESETs to UEs, embodiments in which the 6 RB grid may be aligned will now be described.

Figure 8:
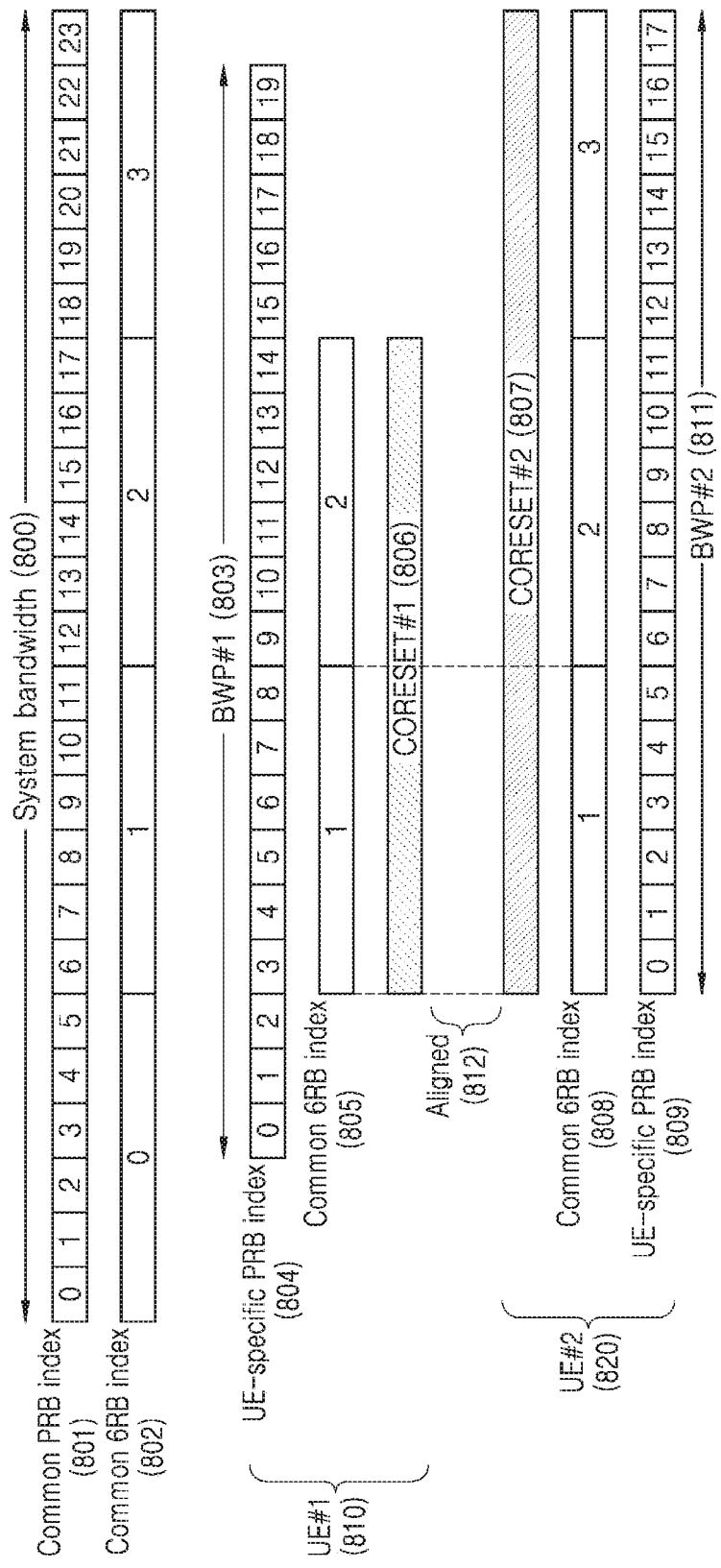
FIG. 8 illustrates a method of configuring frequency allocation with respect to different CORESETs, according to some embodiments.

FIG. 8 illustrates a method of configuring frequency allocation with respect to different CORESETs, according to some embodiments.

As described above, the BS may configure a CORESET in a bandwidth part to a UE, and may indicate, via higher layer signaling, frequency resource allocation information of the CORESET, based on the common PRB index defined above. In this regard, the BS may perform indication by using a bitmap scheme based on a 6 RB unit. In this regard, when the number of RBs in a system bandwidth is $N_{RB}$, a size P (in CORESET allocation, P=6) of a RB group may be indicated by using Method 1 or Method 2 below.

[Method 1]
Bitmap of ceil($N_{RB}$/P) bits
[Method 2]
Bitmap of floor($N_{RB}$/P) bits may be indicated When using [Method 1] above, all RBs of a bandwidth part, i.e., $N_{RB}$ RBs, may be all used in CORESET allocation.

When using [Method 2] above, mod($N_{RB,BWP}$,P) RBs from among all RBs of the bandwidth part, i.e., $N_{RB}$ RBs, may not be used. In this regard, mod(X,Y) may correspond to a modular function for outputting a result obtained by dividing X by Y.

Referring to FIG. 8, the BS may configure CORESET #1 806 in bandwidth part #1 803 to UE #1 810, and may configure CORESET #2 807 in bandwidth part #2 811 to UE #2 820. In this regard, the BS may indicate, to each UE, frequency-axis resource allocation information about CORESET #1 806 and CORESET #2 807, based on common PRB index 801. The BS may calculate common 6 RB index 802, based on common PRB index 801, and may indicate frequency allocation information about CORESETs, based on the calculation, by using a bitmap. In an example of FIG. 8, the number of RBs of system bandwidth 800 is $N_{RB}$=24, and when assuming using [Method 1] or [Method 2] above, frequency allocation information of CORESET #1 806 and CORESET #2 807 may be indicated by using a bitmap of ceil($N_{RB}$/P)(or, floor($N_{RB}$/P))=4 bits. In the example of FIG. 8, 6 RB set 805 corresponding to 1, 2 with reference to common 6 RB index 802 is configured as CORESET #1 806, and 6 RB set 808 corresponding to 1, 2, 3 with reference to common 6 RB index 802 is configured as CORESET #2 807.

Therefore, referring to FIG. 8, CORESET #1 806 and CORESET #2 807 may be aligned (812) in a 6 RB unit.

According to some embodiments, the UE may receive, from the BS, indication of frequency allocation information about a CORESET in a bandwidth part configured to the UE, based on a common PRB index, and may receive DL control information in the configured CORESET.

According to embodiments of FIG. 8, when allocation based on a frequency axis is given to different CORESETs of different UEs having different bandwidth part configurations, a 6 RB-unit grid of the CORESETs overlapping on the frequency axis may be aligned.

Figure 9:
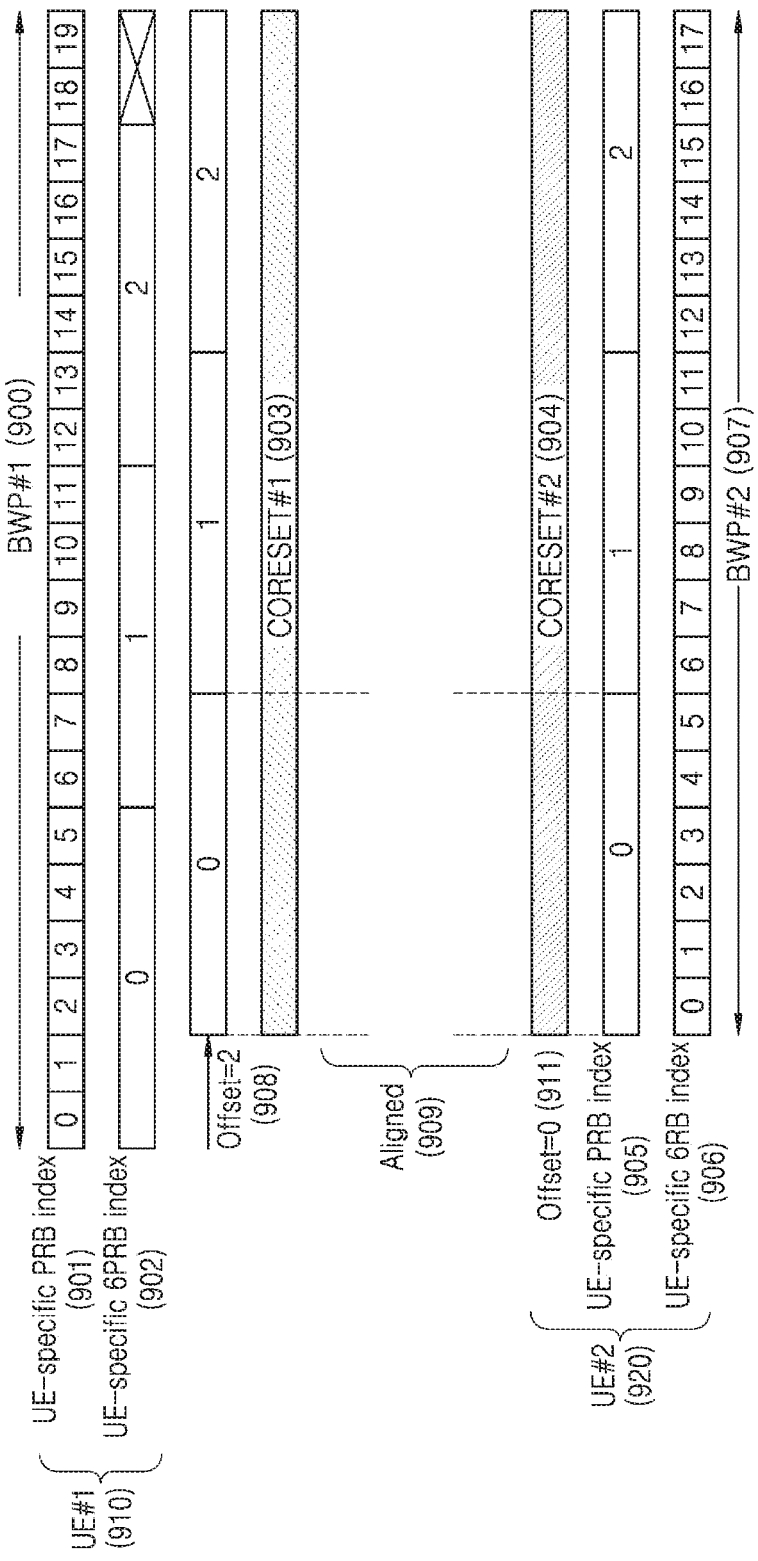
FIG. 9 illustrates a method of configuring frequency allocation with respect to different CORESETs, according to some embodiments.

FIG. 9 illustrates a method of configuring frequency allocation with respect to different CORESETs, according to some embodiments.

According to embodiments, a BS may configure, via higher layer signaling, frequency resource allocation information about a CORESET, based on a PRB index in a bandwidth part configured to a UE. In this regard, the BS may perform indication by using a bitmap scheme based on a 6 RB unit. In this regard, when the number of RBs in the configured bandwidth part is $N_{RB,BWP}$, a size P (in CORESET allocation, P=6) of a RB group may be indicated by using Method 1 or Method 2 below.

[Method 1]
Bitmap of ceil($N_{RB,BWP}$/P) bits
[Method 2]
Bitmap of floor($N_{RB,BWP}$/P) bits may be indicated When using [Method 1] above, all RBs of a bandwidth part, i.e., $N_{RB,BWP}$ RBs, may be all used in CORESET allocation.

When using [Method 2] above, mod($N_{RB,BWP}$,P) RBs from among all RBs of the bandwidth part, i.e., $N_{RB,BWP}$ RBs, may not be used.

Also, according to some embodiments, the BS may additionally indicate the UE of a value of frequency-axis offset (e.g., $\Delta_{RB}$) with respect to a CORESET. In this regard, the value of $\Delta_{RB}$ may be indicated in 1 RB unit (or, NRB unit), and may have a value smaller than P (that is, $0 \leq \Delta_{RB} < P$). Accordingly, final frequency allocation information of the CORESET may be calculated as a combination of a frequency-axis position allocated using the bitmap and the additionally-indicated value of frequency-axis offset (e.g., $\Delta_{RB}$). For example, the BS may indicate the UE of PRB #X, PRB #Y, PRB #Z via a frequency-axis bitmap with respect to the CORESET and may indicate the UE of a frequency-axis offset value of $\Delta_{RB}$=D, and therefore, final frequency-axis allocation information of the CORESET may correspond to PRB #(X+D), PRB #(Y+D), PRB #(Z+D).

Referring to FIG. 9, when the BS indicates UE #1 910 of frequency resource allocation information about CORESET #1 903, the BS may calculate 6 RB index 902 based on PRB index 901 about bandwidth part #1 900, and may indicate, based on the calculation, frequency allocation information of CORESET #1 903 by using a bitmap. Also, the BS may additionally indicate a frequency-axis offset 908 to UE #1 910. In an example of FIG. 9, the number of RBs of bandwidth part #1 900 is $N_{RB,BWP}$=20, and when assuming using [Method 2] above, frequency allocation information of a CORESET may be indicated by using a bitmap of floor ($N_{RB,BWP}$/P)=3 bits. In the example of FIG. 9, a bitmap of CORESET #1 903 may be [1 1 1], that is, may correspond to {0, 1, 2} with reference to 6 RB index 904 of UE #1 901, and may correspond to A={0, 1, 2, . . . , 17} with reference to PRB index 902 of UE #1 901. A value of the additionally-indicated offset 908 may be 2 RBs, and thus, frequency-axis allocation for CORESET #1 903 may correspond to A+offset={0, 1, 2, . . . , 17}+2={2, 3, 4, . . . , 19} with reference to PRB index 901 of UE #1 910.

Equally, when the BS indicates UE #2 920 of frequency resource allocation information about CORESET #2 904, the BS may calculate 6 RB index 906 based on PRB index 905 about bandwidth part #2 907, and may indicate, based on the calculation, frequency allocation information of CORESET #2 904 by using a bitmap. Also, the BS may additionally indicate a frequency-axis offset 911 to UE #2 920. In an example of FIG. 9, the number of RBs of bandwidth part #2 907 is $N_{RB,BWP}$=18, and when assuming using [Method 2] above, frequency allocation information of a CORESET may be indicated by using a bitmap of floor ($N_{RB,BWP}$/P)=3 bits. In the example of FIG. 9, a bitmap of CORESET #2 904 may be [1 1 1], that is, may correspond to {0, 1, 2} with reference to 6 RB index 906 of UE #2 920, and may correspond to A={0, 1, 2, . . . , 17} with reference to PRB index 905 of UE #2 920. A value of the additionally-indicated offset 911 may be 0 RB, and thus, frequency-axis allocation for CORESET #2 904 may correspond to A+offset={0, 1, 2, . . . , 17}+0={0, 1, 2, . . . , 17} with reference to PRB index 905 of UE #2 920.

According to embodiments of FIG. 9, CORESET #1 903 and CORESET #2 904 may be aligned (909) by using a 6 RB-unit grid according to a value of offset 908 configured by the BS.

The UE may receive, from the BS, frequency-axis bitmap information and frequency-axis offset information about a CORESET, based on a PRB index in a bandwidth part configured to the UE, and may receive DL control information in the configured CORESET. According to some embodiments of the disclosure, when allocation based on a frequency axis is given to different CORESETs of different UEs having different bandwidth part configurations, the BS may determine frequency-axis positions of the CORESETs so as to allow a 6 RB-unit grid of the CORESETs overlapping on the frequency axis to be aligned.

Also, according to some embodiments, higher layer signaling for the BS to configure a CORESET to the UE may correspond to at least one of UE-specific RRC signaling, MIB signaling, system information block (SIB) signaling, or cell-common RRC signaling.

The afore-described embodiments of FIGS. 7 to 9 may be individually or collectively used. In other words, when a BS configures a frequency band of a CORESET for grid alignment, the methods of FIGS. 7 to 9 may be individually used or may be used as a combination thereof.

Also, the embodiments described with reference to FIGS. 7 to 9 may be solely used or may be used together with embodiments to be described with reference to FIGS. 10 to 13.

Hereinafter, a PDCCH resource mapping method will now be described.

A BS may generate $N_{bit}$ bit sequence, C={c(0), c(1), c(2), . . . , c($N_{bit}$−1)}, corresponding to DCI to be transmitted to a specific UE.

The DCI bit sequence C may be channel coded to be $M_{bit}$ bit sequence, B={b(0), b(1), b(2), . . . , b($M_{bit}$−1)}.

The channel-coded DCI bit sequence C may be scrambled to be Mbit bit sequence, B˜={b˜(0), b˜(1), b˜(2), . . . , b˜($M_{bit}$−1)}.

The scrambled channel-coded DCI bit sequence B˜ may be QPSK modulated to be $M_{sym}$ modulated symbol sequence, D={d(0), d(1), d(2), . . . , d($M_{sym}$−1)}.

The BS may select an aggregation level (n) at which the modulated symbol sequence D is to be transmitted, and may select a particular PDCCH candidate set q in a search space of the aggregation level. For example, when a search space for AL=n is defined as search space (n)={PDCCH candidate set (q), q=0, 1, . . . , Q−1, where Q is the number of PDCCH candidate sets in AL=n} in a certain UE, the BS may select a random PDCCH candidate set (q). A particular PDCCH candidate set may be a set consisting of CCEs. CCEs that constitute a selected PDCCH candidate set may be a set of REs that are physical resources, and the set of the REs may be defined as REset. That is, REset={RE(k,l)$_{p,\mu}$, where k may be defined as a frequency index (or, a subcarrier index), l may be defined as a time index (or, a symbol index), p may be defined as a CORESET index, and p may be defined as a subcarrier spacing index.

(k,l) that correspond to time and frequency indexes of REs in the REset may be determined based on the number of REs constituting the REset, or may be determined based on an entire system bandwidth, a bandwidth part of a UE, or time and frequency indexes corresponding to a configured CORESET. In the disclosure, it is assumed that (k,l) correspond to indexes that are determined based on the number of REs constituting the REset.

According to some embodiments, various embodiments of a method of mapping DCI symbol sequence D (or, briefly referred to as a PDCCH) to physical resources will now be provided. For conciseness in descriptions about embodiments, p and μ from among parameters described above are omitted. That is, a $p^{th}$ CORESET configured by a random $\mu^{th}$ subcarrier spacing is assumed.

Hereinafter, prior to descriptions about embodiments of the disclosure, operations below will now be defined.

When symbols to be transmitted are mapped to REs, a time-primary and frequency-secondary mapping method may be a method by which REs whose time index increases are primarily selected and mapping is performed thereon, and when a maximum time index is reached, REs whose frequency index increases are selected and then mapping is performed thereon.

Also, when symbols to be transmitted are mapped to REs, a frequency-primary and time-secondary mapping method may be a method by which REs whose frequency index increases are primarily selected and mapping is performed thereon, and when a maximum frequency index is reached, REs whose time index increases are selected and then mapping is performed thereon. However, the disclosure is not limited to the examples, and various mapping methods for which time and frequency are considered may exist. The embodiments of the disclosure may be applicable to the various mapping methods.

Figure 10:
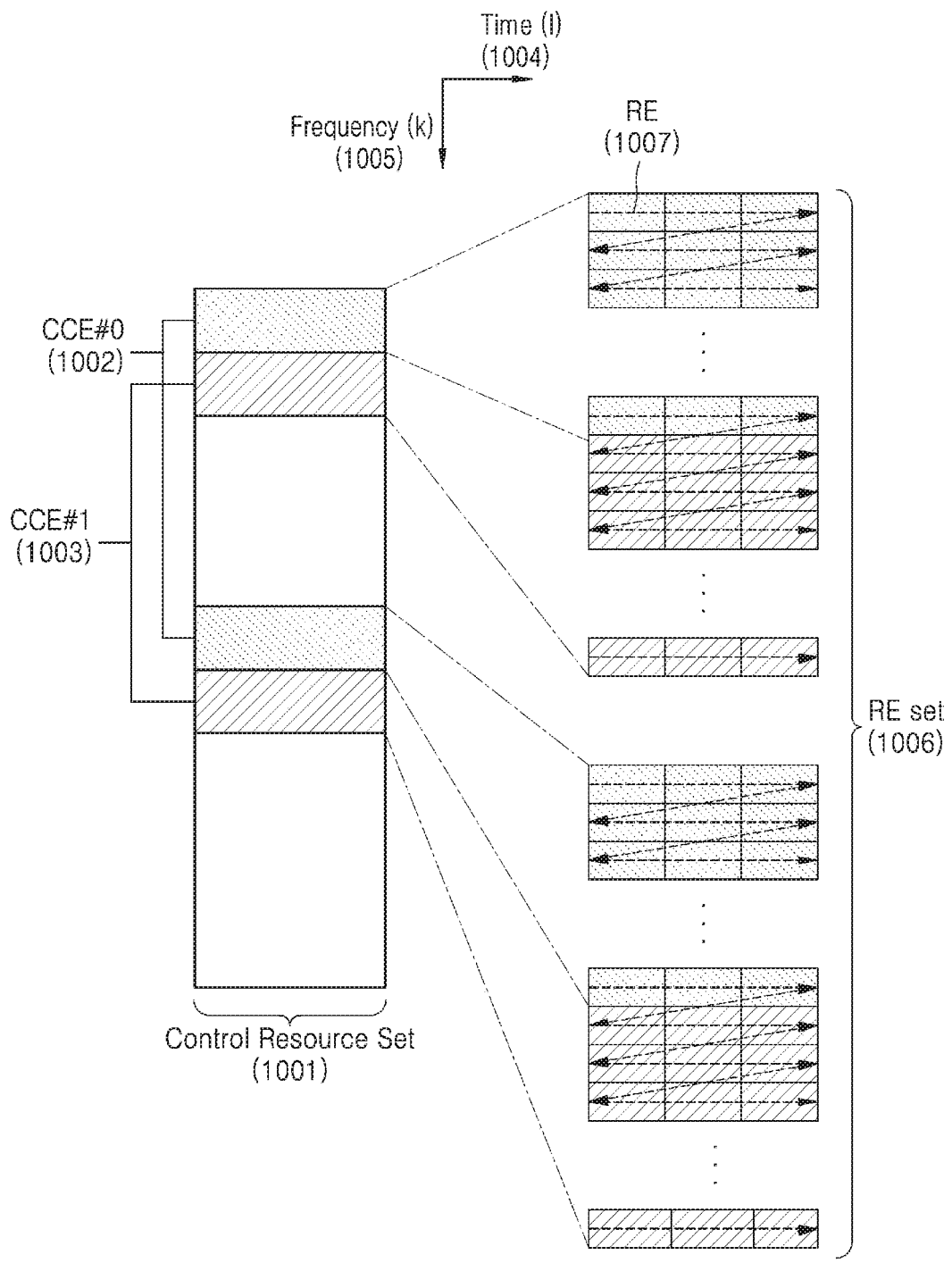
FIG. 10 illustrates a Physical Downlink Control Channel (PDCCH) resource mapping method, according to some embodiments.

Referring to FIG. 10, an example of a PDCCH resource mapping method is shown.

FIG. 10 illustrates an example in which a CORESET 1001 is shown and a PDCCH candidate set corresponding to aggregation level=2 is selected to transmit the modulated PDCCH symbol to be transmitted. Also, the PDCCH candidate set selected in FIG. 10 may correspond to CCE set {CCE #0 1002, CCE #1 1003} composed of two CCEs. All physical resources corresponding to CCE #0 1002 and CCE #1 1003 are defined as RE set 1006, and the RE set 1006 may be composed of REs 1007.

When a BS maps the modulated PDCCH symbol to physical resources, the BS may perform mapping on REs in the RE set 1006 by using a time(1004)—primary and frequency(1005)—secondary method. That is, when configured as RE set={RE(1,1), RE(1,1), . . . , RE(k,l), . . . RE(K,L)} (where, K*L=$M_{sym}$), REs whose time index (l) increases may be primarily selected and mapping may be performed thereon, and then, when a maximum time index (L) is reached, REs whose frequency index (k) increases may be selected and mapping may be performed thereon. Alternatively, when the BS maps the modulated PDCCH symbol to physical resources, the BS may perform mapping on REs in the RE set 1006 by using a frequency(1005)—primary and time(1004)—secondary method. That is, when configured as RE set={RE(1,1), RE(1,1), . . . , RE(k,l), RE(K,L)} (where, K*L=$M_{sym}$), REs whose frequency index (k) increases may be primarily selected and mapping may be performed thereon, and then, when a maximum frequency index (K) is reached, REs whose time index (l) increases may be selected and mapping may be performed thereon.

According to some embodiments, when the time(1004)—primary and frequency(1005)—secondary method is performed on the REs, the BS may allocate a PDCCH symbol sequence D={d(0), d(1), d(2), . . . , d($M_{sym}$−1)} for a specific UE to each physical resource, i.e., each RE, through a procedure below.

1) Reset as m=0
2) Reset as k=0
3) Reset as l=0
4) When RE (k,l) corresponds to a RE that is available in PDCCH transmission,
5) map d(m) to RE(k,l)
6) update as m=m+1
7) update as l=l+1
8) when l<L, repeat from operation 4) (where, L denotes the number of symbols configured as CORESET)
9) update as k=k+1
10) when k*l<$M_{sym}$, repeat from operation 2)

When the frequency(1005)—primary and time(1004)—secondary method is performed on the REs, the BS may switch frequency(1005) index (k) and time(1004) index(I) therebetween in the procedure and then may perform a same procedure. That is, the procedure may be represented as below.

1) Reset as m=0
2) Reset as l=0
3) Reset as k=0
4) When RE (k,l) corresponds to a RE that is available in PDCCH transmission,
5) map d(m) to RE(k,l)
6) update as m=m+1
7) update as k=k+1
8) when k<K, repeat from operation 4) (where, L denotes the number of symbols configured as CORESET)
9) update as l=l+1
10) when k*l<$M_{sym}$, repeat from operation 2)

A UE may assume that the PDCCH is mapped according to the method, and may perform blind decoding on the PDCCH.

In the embodiment of FIG. 10, a method of mapping a PDCCH symbol to physical resources may involve performing mapping on an entire physical resource RE set by using a time-primary and frequency-secondary method (or, a frequency-primary and time-secondary method), the physical resource RE set corresponding to a PDCCH candidate set in which the PDCCH symbol is to be transmitted.

When describing other embodiments below, the time-primary and frequency-secondary method is used as a representative example. However, a same method may be applicable to the frequency-primary and time-secondary method. When describing the disclosure, for conciseness, a case to which the frequency-primary and time-secondary method is applied will be briefly described.

Figure 11:
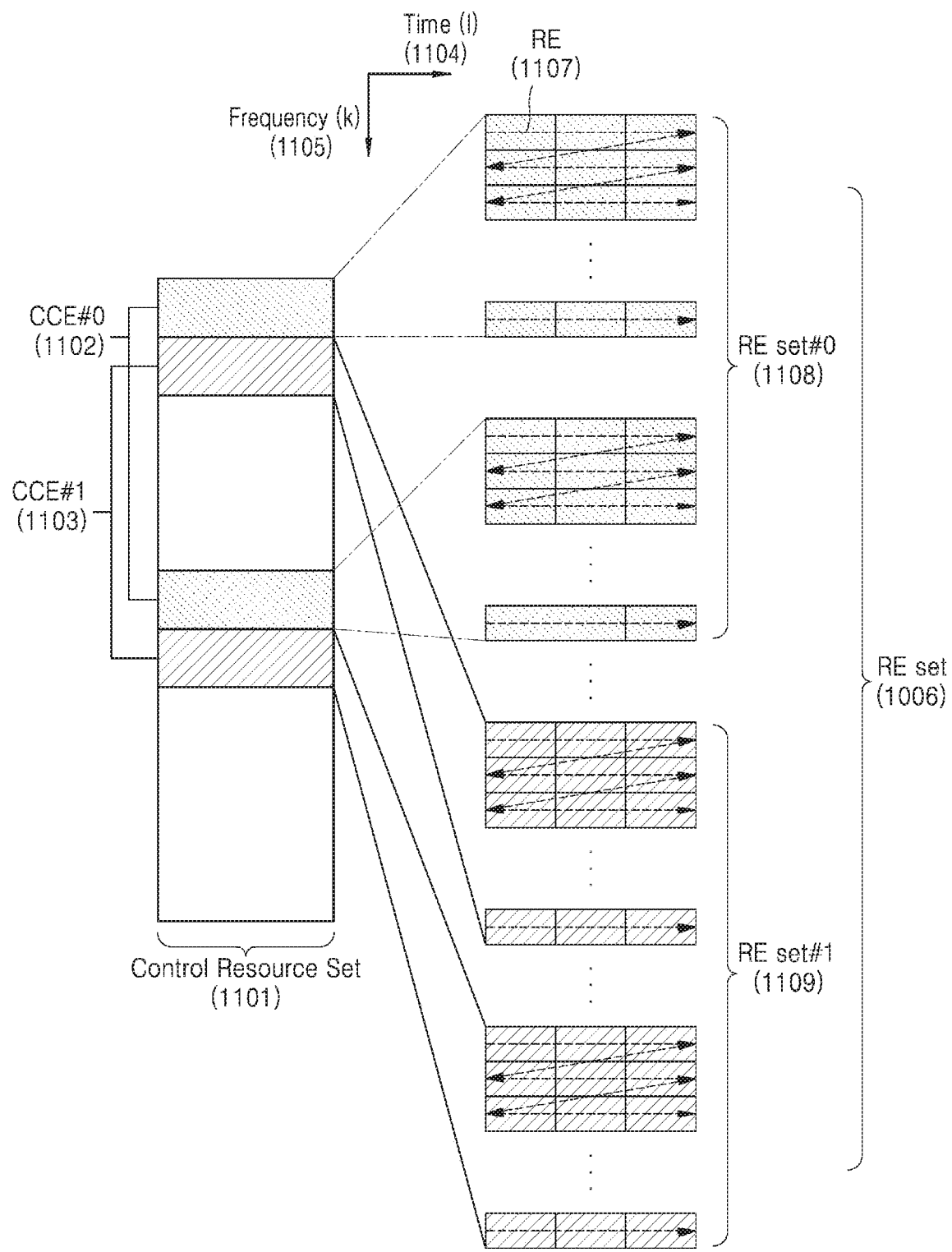
FIG. 11 illustrates a PDCCH resource mapping method, according to some embodiments.

FIG. 11 illustrates an example of a PDCCH resource mapping method, according to some embodiments.

FIG. 11 illustrates an example in which a CORESET 1101 is shown and a PDCCH candidate set corresponding to aggregation level=2 is selected to transmit the modulated PDCCH symbol to be transmitted. Also, the PDCCH candidate set selected in FIG. 11 may correspond to CCE set {CCE #0 1102, CCE #1 1103} composed of two CCEs. All physical resources corresponding to CCE #0 1102 and CCE #1 1103 are defined as RE set 1106, and the RE set 1106 may be composed of REs 1107. Referring to FIG. 11, a set of REs 1107 may be composed of RE set #0 1108 corresponding to CCE #0 1102 and RE set #1 1109 corresponding to CCE #1 1103.

When a BS maps the modulated PDCCH symbol to physical resources, the BS may first select CCE (e.g., CCE #0 1102 in FIG. 11) whose index corresponds to a small value, may select a RE set (e.g., RE set #0 1108 in FIG. 11) corresponding to the CCE, and then may perform mapping on REs in the RE set by using a time(1104)—primary and frequency(1105)—secondary method (or, a frequency (1105)—primary and time(1104)—secondary method).

That is, when a RE set of $x^{th}$ CCE is configured as RE set(x)={RE(1,1), RE(1,1), . . . , RE(k,l), RE(K,L)} (where, K*L=$M_{sym}$/X,X correspond to aggregation levels), the BS may select a RE set(x) where CCE index(x) increases, and may primarily select REs whose time index (l) (or, frequency index (k)) increases and perform mapping thereon, and then, when a maximum time index (L) (or, a maximum frequency index (K)) is reached, the BS may select REs whose frequency index (k) (or, time indexes (l)) increases and perform mapping thereon, and then, when a maximum frequency index (K) (or, a maximum time index (L)) is reached (or, when mapping is equally completed with respect to all REs in a corresponding RE set), the BS may select a RE set of CCEs whose CCE index(x) increases, and when a maximum CCE index (X) is reached, the BS may end mapping.

FIG. 11 illustrates an example in which the time(1104)—primary and frequency(1105)—secondary method is considered.

Referring to FIG. 11, a modulated PDCCH symbol may be first mapped to RE set #0 1108 corresponding to CCE #0 1102, and mapping may be performed in RE set #0 1108 by using a time-primary and frequency-secondary method. After mapping in CCE #0 1102 is completely performed, the modulated PDCCH symbol may be mapped to RE set #1 1109 corresponding to CCE #1 1103, and mapping may be performed in RE set #1 1109 by using a time-primary and frequency-secondary method.

That is, a BS may allocate a PDCCH symbol sequence D={d(0), d(1), d(2), . . . , d($M_{sym}$−1)} for a specific UE to each physical resource, i.e., each RE, through a procedure below.

1) Reset as m=0
2) Reset as x=0
3) Reset as k=0 (or, l=0)
4) Reset as l=0 (or, k=0)
5) When RE (k,l) corresponds to a RE that is available in PDCCH transmission,
6) map d(m) to RE(k,l)
7) update as m=m+1
8) update as l=l+1 (or, k=k+1)
9) when l<L (or, k<K), repeat from operation 5) (where, L denotes the number of symbols configured as CORESET)
10) update as k=k+1 (or, l=l+1)
11) when k*l<$M_{sym}$/X, repeat from operation 4)
12) update as x=x+1
13) when x<X, repeat from operation 3)

A UE may assume that the PDCCH is mapped according to the method, and may perform blind decoding on the PDCCH.

In the embodiment of FIG. 11, a method of mapping a PDCCH symbol to physical resources may involve performing mapping on a physical resource RE set by using a time-primary and frequency-secondary method (or, a frequency-primary and time-secondary method), the physical resource RE set corresponding to a CCE whose index is small from among CCEs constituting a PDCCH candidate set in which the PDCCH symbol is to be transmitted. According to the example of FIG. 11 using the PDCCH physical resource mapping method, a diversity gain or an interleaving gain in a CCE unit may be additionally achieved.

Figure 12:
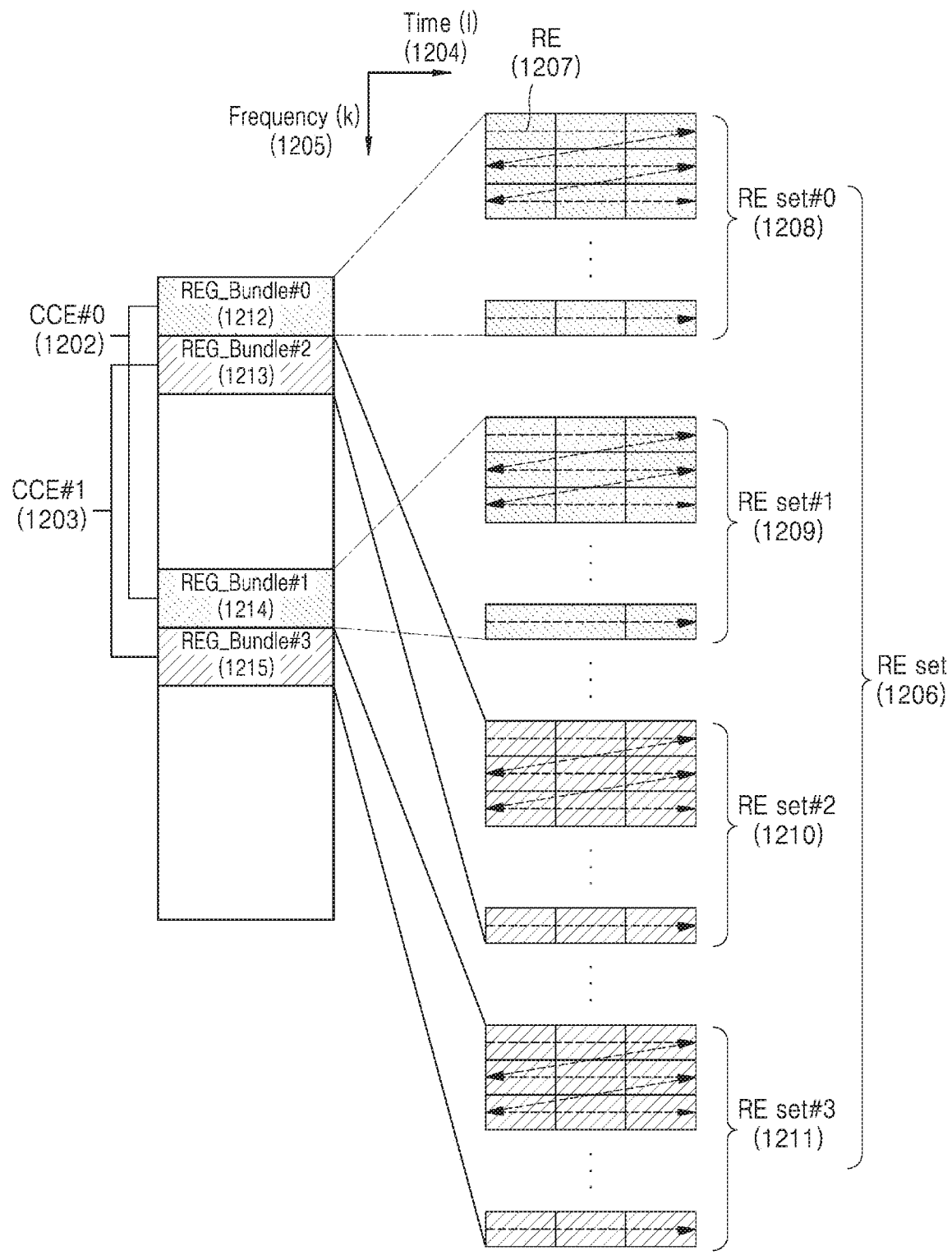
FIG. 12 illustrates a PDCCH resource mapping method, according to some embodiments.

FIG. 12 illustrates a PDCCH resource mapping method, according to some embodiments.

FIG. 12 illustrates an example in which a CORESET 1201 is shown and a PDCCH candidate set corresponding to aggregation level=2 is selected to transmit the modulated PDCCH symbol to be transmitted. Also, the PDCCH candidate set selected in FIG. 12 may correspond to CCE set {CCE #0 1202, CCE #1 1203} composed of two CCEs. All physical resources corresponding to CCE #0 1202 and CCE #1 1203 are defined as RE set 1206, and the RE set 1206 may be composed of REs 1207.

In FIG. 12, the RE set 1206 may be composed of RE set #0 1208 corresponding to REG_bundle #0 1212 constituting CCE #0 1202, RE set #1 1209 corresponding to REG_bundle #1 1214 constituting CCE #0 1202, and RE set #2 1210 corresponding to REG_bundle #2 1213 constituting CCE #1 1203 and RE set #3 1211 corresponding to REG_bundle #3 1215 constituting CCE #1 1203.

When a BS maps the modulated PDCCH symbol to physical resources, the BS may first select CCE (e.g., CCE #0 1202 in FIG. 12) whose index corresponds to a small value, may select a REG bundle (e.g., REG_bundle #0 1212 in FIG. 12) whose REG bundle index corresponds to a small value, the REG bundle being from a REG bundle set constituting a corresponding CCE, may select a RE set (e.g., RE set #0 1208 in FIG. 12) of the REG bundle, and then may perform mapping on REs in the RE set by using a time (1204)—primary and frequency(1205)—secondary method (or, a frequency(1205)—primary and time(1204)—secondary method).

That is, when a RE set of $y^{th}$ REG bundle of $x^{th}$ CCE is configured as RE set(x,y)={RE(1,1), RE(1,1), . . . , RE(k,l), . . . RE(K,L)} (where, K*L=$M_{sym}$/X/Y, X correspond to aggregation levels, Y corresponds to a total number of REG bundles), the BS may select a RE set(x,y) corresponding to a REG bundle whose REG bundle index(y) is small in a REG bundle set corresponding to a CCE whose CCE index (x) is small, may primarily select REs whose time index (l) (or, frequency indexes (k)) increases and perform mapping thereon, and then, when a maximum time index (L) (or, a maximum frequency index (K)) is reached, the BS may select REs whose frequency index (k) (or, time index (l)) increases and perform mapping thereon, and then, when a maximum frequency index (K) (or, a maximum time index (L)) is reached, the BS may select a RE set where REG bundle index (y) increases, and then, when a maximum REG bundle index (Y) is reached, the BS may select a RE set of CCEs whose CCE index(x) increases, and when a maximum CCE index (X) is reached, the BS may end mapping.

That is, referring to FIG. 12, a modulated PDCCH symbol may be first mapped to RE set #0 1208 corresponding to REG_bundle #0 1212 of CCE #0 1202, and mapping may be performed in RE set #0 1208 by using a time-primary and frequency-secondary method (or, a frequency-primary and time-secondary method). After mapping in REG_bundle #0 1212 is completely performed, the modulated PDCCH symbol may be mapped to RE set #1 1209 corresponding to REG_bundle #1 1214, and mapping may be performed in RE set #1 1209 by using a time-primary and frequency-secondary method. Also, after mapping in CCE #0 1202 is completely performed, the BS may repeatedly perform same mapping in CCE #1 1203.

That is, the BS may allocate a PDCCH symbol sequence D={d(0), d(1), d(2), . . . , d($M_{sym}$−1)} for a specific UE to each physical resource, i.e., each RE, through a procedure below.

1) Reset as m=0
2) Reset as x=0
3) Reset as y=0
4) Reset as k=0 (or, l=0)
5) Reset as l=0 (or, k=0)
6) When RE (k,l) corresponds to a RE that is available in PDCCH transmission,
7) map d(m) to RE(k,l)
8) update as m=m+1
9) update as l=l+1

10) when l<L (or, k<K), repeat from operation 6) (where, L denotes the number of symbols configured as CORESET)
11) update as k=k+1 (or, l=l+1)
12) when k*l<$M_{sym}$/X/Y, repeat from operation 5)
13) update as y=y+1
14) when y<Y, repeat from operation 4)
15) update as x=x+1
16) when x<X, repeat from operation 3)

A UE may assume that the PDCCH is mapped according to the method, and may perform blind decoding on the PDCCH. In the embodiment of FIG. 12, a method of mapping a PDCCH symbol to physical resources may involve performing mapping on a physical resource RE set by using a time-primary and frequency-secondary method (or, a frequency-primary and time-secondary method), the physical resource RE set corresponding to a REG bundle with a small index from among REG bundles of a CCE constituting a PDCCH candidate set in which the PDCCH symbol is to be transmitted. According to the embodiment of FIG. 12 using the PDCCH physical resource mapping method, a diversity gain or an interleaving gain in a REG bundle unit may be additionally achieved.

Figure 13:
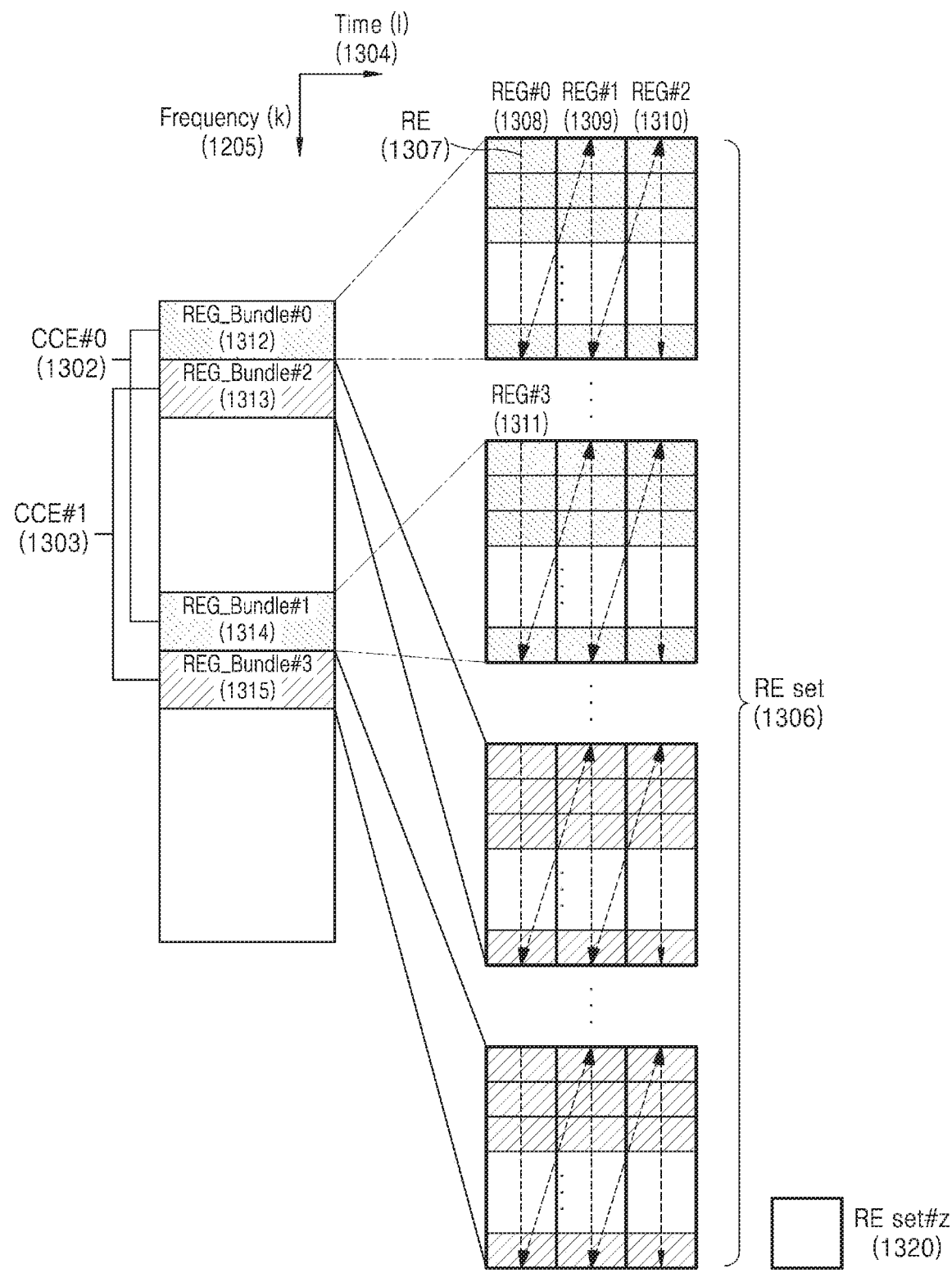
FIG. 13 illustrates a PDCCH resource mapping method, according to some embodiments.

FIG. 13 illustrates a PDCCH resource mapping method, according to some embodiments.

FIG. 13 illustrates an example in which a CORESET 1301 is shown and a PDCCH candidate set corresponding to aggregation level=2 is selected to transmit the modulated PDCCH symbol to be transmitted. Also, the PDCCH candidate set selected in FIG. 13 may correspond to CCE set {CCE #0 1302, CCE #1 1303} composed of two CCEs. All physical resources corresponding to CCE #0 1302 and CCE #1 1303 are defined as RE set 1306, and the RE set 1306 may be composed of REs 1307.

In FIG. 13, the RE set 1306 may be composed of RE set 1320 corresponding to REG #0 1308 constituting REG_bundle #0 1312 constituting CCE #0 1302, RE set 1320 corresponding to REG #1 1309 constituting REG_bundle #0 1312 constituting CCE #0 1302, RE set 1320 corresponding to REG #2 1310 constituting REG_bundle #0 1312 constituting CCE #0 1302, RE set 1320 corresponding to REG #3 1311 constituting REG_bundle #1 1314 constituting CCE #0 1302, . . . (omitted) (because it is a same technology, omission is made thereto).

When a BS maps the modulated PDCCH symbol to physical resources, the BS may first select CCE (e.g., CCE #0 1302 in FIG. 13) whose index corresponds to a smallest value, may select a REG bundle (e.g., REG_bundle #0 1312 in FIG. 13) whose REG bundle index corresponds to a smallest value, the REG bundle being from a REG bundle set constituting a corresponding CCE, may select a REG (e.g., REG #0 1308 in FIG. 13) with a smallest REG index in a REG set constituting a corresponding REG bundle, and then may perform mapping on REs in the REG by using a frequency(1305)—primary method). In this regard, a REG is composed of 12 subcarriers of 1 symbol, and thus a RE set corresponding to a particular REG has only an index of a frequency domain.

That is, when a RE set constituting $z^{th}$ REG of $y^{th}$ REG bundle of $x^{th}$ CCE is configured as RE set(x,y,z)={RE(1), RE(2), . . . , RE(k), RE(K)} (where, K=$M_{sym}$/X/Y/Z=12, X correspond to an aggregation level, Y corresponds to a total number of REG bundles, and Z corresponds to the number of REGs per REG bundle, the BS may select a RE set(x,y,z) corresponding to a REG whose REG bundle index(z) is small in a REG set corresponding to a REG bundle whose REG bundle index(y) is small in a REG bundle set corresponding to CCE whose CCE index (x) is small, may primarily select REs whose frequency index (k) increases and perform mapping thereon, and then, when a maximum frequency index (K) is reached, the BS may select a REG whose REG index (z) increases, and then, when a maximum REG index (Z) is reached, the BS may select a REG bundle whose REG bundle index (y) increases, and then, when a maximum REG bundle index (Y) is reached, the BS may select CCE whose CCE index (x) increases, when a maximum CCE index (X) is reached, the BS may end mapping.

Referring to FIG. 13, a modulated PDCCH symbol may be first mapped to REG #0 1308 of REG_bundle #0 1312 of CCE #0 1302, and frequency-primary mapping may be performed on REG #0 1308.

After mapping on REG #0 1308 is completely performed, the BS may perform mapping on REs corresponding to REG #1 1309. After mapping is performed on all REGs of REG_bundle #0 1312, the BS may repeat a same procedure on REG_bundle #1 1314 in CCE #0 1302. After mapping is performed on all REG bundles in CCE #0 1302, the BS may repeat a same procedure on CCE #1 1303.

That is, the BS may allocate a PDCCH symbol sequence D={d(0), d(1), d(2), . . . , d($M_{sym}$-1)} for a specific UE to each physical resource, i.e., each RE, through a procedure below.
1) Reset as m=0
2) Reset as x=0
3) Reset as y=0
4) Reset as z=0
5) Reset as k=0
6) Reset as l=0
7) When RE (k,l) corresponds to a RE that is available in PDCCH transmission,
8) map d(m) to RE(k,l)
9) update as m=m+1
10) update as l=l+1
11) when l<L, repeat from operation 7) (where, L denotes the number of symbols configured as CORESET)
12) update as k=k+1
13) when k*l<$M_{sym}$/X/Y, repeat from operation 6)
14) update as z=z+1
15) when z<Z, repeat from operation 5)
14) update as y=y+1
15) when y<Y, repeat from operation 4)
16) update as x=x+1
17) when x<X, repeat from operation 3)

Alternatively, a RE set in REG may be represented as below, in consideration that only a frequency index is defined.
1) Reset as m=0
2) Reset as x=0
3) Reset as y=0
4) Reset as z=0
5) Reset as k=0
6) When RE (k) corresponds to a RE that is available in PDCCH transmission,
7) map d(m) to RE(k)
8) update as m=m+1
9) update as k=k+1
10) when k<$M_{sym}$/X/Y (or, k<K), repeat from operation 6)
11) update as z=z+1
12) when z<Z, repeat from operation 5)
13) update as y=y+1
14) when y<Y, repeat from operation 4)
15) update as x=x+1
16) when x<X, repeat from operation 3)

A UE may assume that the PDCCH is mapped according to the method, and may perform blind decoding on the PDCCH. In the embodiment of FIG. 13, a method of mapping a PDCCH symbol to physical resources may involve performing mapping on a physical resource RE set by using a frequency-primary method, the physical resource RE set corresponding to REGs constituting a REG bundle constituting a CCE constituting a PDCCH candidate set in which the PDCCH symbol is to be transmitted. According to the embodiment of FIG. 13 using the PDCCH physical resource mapping method, a diversity gain or an interleaving gain in a REG unit may be additionally achieved.

The embodiments of FIGS. 10 to 13 may be individually or collectively used. In other words, when a BS maps DL control information to physical resources, the methods of FIGS. 10 to 13 may be individually used or may be used as a combination thereof. The physical resource mapping method is not limited to those shown in FIGS. 10 to 13 and thus may be modified to the extent that one of ordinary skill in the art can understand.

Also, the embodiments described with reference to FIGS. 10 to 13 may be solely used or may be used together with the embodiments described with reference to FIGS. 7 to 9.

Next, a PDCCH scrambling method according to some embodiments of the disclosure will now be proposed. Scrambling may refer to an operation of calculating a random bit sequence with a bit sequence to be transmitted and thus generating a randomized bit sequence. Inter-cell interference may be randomized through the scrambling. For example, when a $M_{bit}$-size bit sequence with respect to a PDCCH is b(0), b(1), ..., b($M_{bit}$−1), a bit sequence b'(0), b'(1), ..., b'($M_{bit}$−1) after the scrambling performed in a manner below may be as below.

$$b'(i) = b(i) + c(i) \bmod 2 \quad \text{[Equation 1]}$$

i=0, 1, 2, ..., Mbit−1
c(i) denotes scrambling sequence

The scrambling sequence c(i) may be generated by using a method below.

$$c(n) = (x_1 N_c) + x_1(n + N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 2]}$$

n=0, 1, ..., 30
$N_C$=1600
First m-sequence: $x_1(0)=1$, $x_1(n)=0$
Second m-sequence:

$$c_{init} = \sum_{i=0}^{30} x_2(i) \cdot 2^i$$

$c_{init}$: initial sequence
The initial sequence $c_{init}$ may be represented as Equation below.

$$c_{init} = \lfloor n_s / N_{slot}^{subframe,\mu} \rfloor \cdot 2^{10} + n_{ID,p}$$

In Equation 3, $n_s$ may denote a slot index.
In Equation 3, $N_{slot}^{subframe,\mu}$ may denote one subframe, i.e., the number of slots included in 1 ms.

According to some embodiments, because NR supports various numerologies, the number of slots in one frame composed of 10 subframes, each having a length of 1 ms, may be as shown in FIG. 5. In Table 5, $N_{slot}^{frame,\mu}$ may denote the number of slots included in one frame, i.e., 10 ms, and $N_{slot}^{subframe,\mu}$ may denote the number of slots included in one subframe, i.e., 1 ms.

TABLE 4

| μ | Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Table 4 shows supported transmission numerologies.

TABLE 5

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 5 shows $N_{symb}^{slot}$ that is the number of OFDM symbols per slot with respect to a normal cyclic prefix, and means that, when a slot index $n_s$ is defined based on one frame as in LTE, a largest value of $n_s$ may vary according to numerologies.

In Equation 3, $n_{ID,p}$ may denote an identifier (ID) by which a BS configures a $p^{th}$ CORESET to a UE. The BS may configure a value of $n_{ID,p}$ to the UE via UE-specific RRC signaling, and the value may correspond to one of values of (0, 1, ..., 1007).

According to Equation 3, a scrambling sequence with respect to a PDCCH may be reset by a reference time, i.e., a 1-ms unit.

Next, a method of generating a DMRS sequence of a PDCCH according to the disclosure will now be proposed. The DMRS sequence of the PDCCH may be represented as Equation below.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 4]}$$

In Equation 4, c(i) may be defined to be equal to a sequence defined in Equation 2 above. In this regard, the initial sequence $c_{init}$ may follow Equation 5 below.

$$c_{init} = (\lfloor n_s / N_{slot}^{subframe,\mu} \rfloor + 1) \cdot (2 \cdot n_{ID,p} + 1) \cdot 2^{10} + n_{ID,p} \quad \text{[Equation 5]}$$

According to FIG. 5, an initial sequence may be determined based on an identifier, $n_{ID,p}$, which is configured to a $p^{th}$ CORESET of the UE by the BS. The BS may configure a value of $n_{ID,p}$ to the UE via UE-specific RRC signaling, and the value may correspond to one of values of (0, 1, ..., 1007). Alternatively, $n_{ID,p}$ may be equal to a cell ID. For a CORESET configured by a MIB, $n_{ID,p}$ may be equal to the cell ID, and for a CORESET configured by RRC, a value configured to the UE by the BS may be applied to $n_{ID,p}$. $n_{ID,p}$ (i.e., $n_{ID,p}$ of Equation 4) that is applied to determine a sequence initial value $c_{init}$ for PDCCH scrambling may be equal to $n_{ID,p}$ that is applied to determine a sequence initial value $c_{init}$ to generate a DMRS sequence. Alternatively, they may be differently configured.

According to Equation 5, randomization may be effectively performed in a manner that an initial sequence $c_{init}$ is reset by 1 ms that is a reference time.

According to another embodiment, c(i) in Equation 4 above may be defined to be equal to a sequence defined in Equation 2. In this regard, the initial sequence $c_{init}$ may follow Equation 6 below.

$$c_{init}=(\lfloor n_s/N_{slot}^{subframe,\mu} \rfloor+1)\cdot(2\cdot n_{ID,p}+1)\cdot 2^{10}+n_{SCID,p},\quad \text{[Equation 6]}$$

According to Equation 6, an initial sequence may be determined based on an identifier, $n_{ID,p}$, which is configured to a $p^{th}$ CORESET of the UE by the BS. The BS may configure a value of $n_{ID,p}$ to the UE via UE-specific RRC signaling, and the value may correspond to one of values of (0, 1, ..., 1007). Alternatively, $n_{ID,p}$ may be equal to a cell ID. For a CORESET configured by a MIB, $n_{ID,p}$ may be equal to the cell ID, and for a CORESET configured by RRC, a value configured to the UE by the BS may be applied to $n_{ID,p}$. $n_{ID,p}$ (i.e., $n_{ID,p}$ of Equation 4) that is applied to determine a sequence initial value $c_{init}$ for PDCCH scrambling may be equal to $n_{ID,p}$ that is applied to determine a sequence initial value $c_{init}$ to generate a DMRS sequence. Alternatively, they may be differently configured.

According to Equation 6, an initial sequence may be determined based on a scrambling identifier, $n_{SCID,p}$, which is configured to a $p^{th}$ CORESET of the UE by the BS. The BS may configure a value of $n_{SCID,p}$ to the UE via UE-specific RRC signaling, and the value may correspond to one of values of (0, 1). Because a scrambling ID is considered, the disclosure may be effectively applied to a BS cooperative technology (e.g., coordinated multi-points (CoMP)) such as Dynamic Point Selection (DPS).

According to Equation 6, randomization may be effectively performed in a manner that an initial sequence $c_{init}$ is reset by 1 ms that is a reference time.

According to another embodiment, c(i) in Equation 4 above may be defined to be equal to a sequence defined in Equation 2. In this regard, the initial sequence $c_{init}$ may follow Equation 7 below.

$$c_{init}=2^{10}\cdot(14\cdot(\lfloor n_s/N_{slot}^{subframe,\mu} \rfloor+1)+l+1)\cdot(2\cdot n_{ID,p}+1)+n_{ID,p} \quad \text{[Equation 7]}$$

According to Equation 7, an initial sequence may be determined based on an identifier, $n_{ID,p}$, which is configured to a $p^{th}$ CORESET of the UE by the BS. The BS may configure a value of $n_{ID,p}$ to the UE via UE-specific RRC signaling, and the value may correspond to one of values of (0, 1, ..., 1007). Alternatively, $n_{ID,p}$ may be equal to a cell ID. For a CORESET configured by a MIB, $n_{ID,p}$ may be equal to the cell ID, and for a CORESET configured by RRC, a value configured to the UE by the BS may be applied to $n_{ID,p}$. $n_{ID,p}$ (i.e., $n_{ID,p}$ of Equation 4) that is applied to determine a sequence initial value $c_{init}$ for PDCCH scrambling may be equal to $n_{ID,p}$ that is applied to determine a sequence initial value $c_{init}$ to generate a DMRS sequence. Alternatively, they may be differently configured.

In Equation 7, l may correspond to a symbol index in a slot. l may correspond to a value from among {0, 1, 2, ..., 13}.

According to Equation 7, an initial sequence $c_{init}$ to generate a DMRS may be reset and randomized in every symbol. Therefore, inter-cell interference may be randomized as a symbol level.

In Equation 4 above, definition of m={0, 1, 2, ..., $X*Y*N_{RB,max}-1$} may be made. A value of X may be equal to the number of REs in which a DMRS is transmitted per REG. For example, when the number of REs in which a DMRS is transmitted per REG is 3, X=3.

A value of Y may be determined by using a method below.

[Method 1]

Y may be equal to a length of a maximum available OFDM symbol in a CORSET. When a maximum value of the OFDM symbol that is configurable as the CORESET is 3, Y=3. Because one CORESET may have maximum Y length, when [Method 1] is used, a DMRS sequence with respect to a $y^{th}$ symbol in the CORESET may be determined as a DMRS sequence corresponding to a corresponding symbol in a generated entire sequence c(m), m={0, 1, 2, ..., $X*Y*N_{RB,max}-1$}. In a case where a plurality of CORESETS, each having Y symbol length, exist in a slot, for example, in a case where there are CORESET #1 where Y=3 and CORESET #2 where Y=3, a same DMRS may be used for CORESET #1 and CORESET #2. That is, a DMRS in $y(=1, 2, 3)^{th}$ symbol of CORESET #1 may be equal to a DMRS in $y(1, 2, 3)^{th}$ symbol of CORESET #2.

[Method 2]

Y may be equal to the number of OFDM symbols in one slot. One slot may be composed of 14 OFDM symbols, and thus Y=14.

Y is equal to the number of OFDM symbols corresponding to a slot length, and thus a DMRS sequence in a particular symbol of a particular CORESET in a slot may be determined due to an index of the particular symbol. That is, in a method of determining a DMRS sequence with respect to a $n^{th}$ symbol in a particular CORESET, when the $n^{th}$ symbol of the CORESET corresponds to a symbol index k in a slot, a sequence corresponding to a $k^{th}$ symbol in an entire sequence c(m), m={0, 1, 2, ..., $X*Y*N_{RB,max}-1$} may be applied. Providing the descriptions through a particular example, when a CORESET having 3-symbol length is configured in OFDM corresponding to $\{2, 3, 4\}^{th}$ symbol index in a slot, a DMRS sequence corresponding to $\{2, 3, 4\}^{th}$ symbol index in a DMRS entire sequence c(m), m={0, 1, 2, ..., $X*Y*N_{RB,max}-1$} may be applied.

In another embodiment, in a case where CORESET #1 and CORESET #2 having 2-symbol length are configured in a slot, wherein CORESET #1 is configured in an OFDM symbol corresponding to $\{0, 1\}^{th}$ symbol index in the slot, and CORESET #2 is configured in an OFDM symbol corresponding to $\{2, 3\}^{th}$ symbol index in the slot, a DMRS sequence corresponding to $\{0, 1\}^{th}$ symbol index in a DMRS entire sequence c(m), m={0, 1, 2, ..., $X*Y*N_{RB,max}-1$} may be applied as a DMRS sequence of CORESET #1, and a DMRS sequence corresponding to $\{2, 3\}^{th}$ symbol index in a DMRS entire sequence c(m), m={0, 1, 2, ..., $X*Y*N_{RB,max}-1$} may be applied as a DMRS sequence of CORESET #2.

$N_{RB,max}$ may denote a maximum number of RBs that are supportable by a system. For example, when the supportable number of RBs is 275, $N_{RB,max}=275$. Alternatively, $N_{RB,max}$ may correspond to the number of RBs corresponding to a configured bandwidth part (BWP). For example, when a bandwidth part of 100 RB is configured, $N_{RB,max}=100$.

Figure 14:
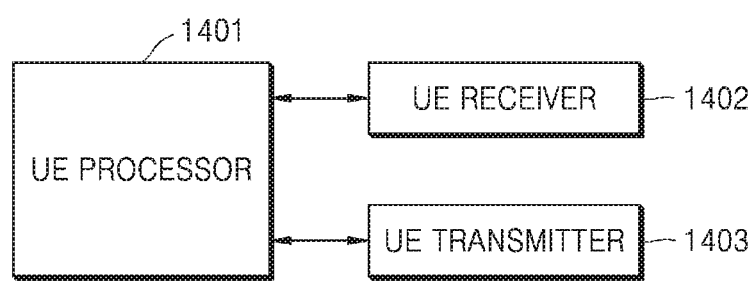
FIG. 14 is a block diagram illustrating an internal structure of a user equipment (UE), according to some embodiments.
Figure 15:
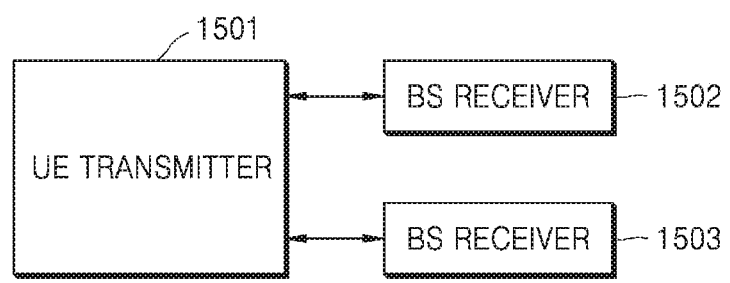
FIG. 15 is a block diagram illustrating an internal structure of a base station (BS), according to some embodiments.

A transmitter, a receiver, and a controller of each of a UE and a BS for performing the embodiments of the disclosure are illustrated in FIGS. 14 and 15. Transmitting and receiving methods performed by the BS and the UE to apply a method of transmitting and receiving a DL channel and a data channel according to the embodiment in the 5G communication system are shown, and to perform the methods, the transmitter, the receiver, and the controller of each of the UE and the BS each have to operate according to embodiments.

In detail, FIG. 14 is a block diagram illustrating an internal structure of the UE, according to an embodiment of the disclosure. As illustrated in FIG. 14, the UE of the disclosure may include a UE processor 1401, a receiver 1402, and a transmitter 1403. However, elements of the UE are not limited to the aforementioned example. For example, the UE may include more elements than the aforementioned elements or may include fewer elements than the aforementioned elements. Also, the UE processor 1401, the receiver 1402, and the transmitter 1403 may be integrated to one chip. Also, the UE may further include a memory (not shown).

According to some embodiments, the UE processor 1401 may control a series of procedures to operate the UE according to the afore-described embodiments of the disclosure. For example, the method of receiving a DL control channel according to an embodiment of the disclosure may be differently controlled.

According to some embodiments, the UE processor 1401 may obtain frequency information about a CORESET configured by the BS based on at least one bandwidth part, the frequency information being received via the transmitter 1403, and may process control information received based on the obtained frequency information. Also, the UE processor 1401 may include at least one processor.

According to some embodiments, the UE receiver 1402 and the UE transmitter 1403 may be collectively called a transceiver in the disclosure. The transceiver may transmit and receive signals to and from the BS. The signals may include control information and data. To this end, the transceiver may include a RF transmitter for up-converting a frequency of and amplifying a signal to be transmitted, and an RF receiver for low-noise amplifying and down-converting a frequency of a received signal. Also, the transceiver may receive a signal through a wireless channel and output the signal to the UE processor 1401, and may transmit a signal output from the UE processor 1401, through a wireless channel.

According to some embodiments, the memory (not shown) may store the program and data necessary for operations of the UE. Also, the memory may store control signal or data included in a signal obtained by the UE. The memory may be implemented as a storage medium or a combination of storage media including read-only memory (ROM), random-access memory (RAM), a hard disk, compact disc-ROM (CD-ROM), digital versatile disc (DVD), or the like.

FIG. 15 is a block diagram illustrating an internal structure of a BS, according to an embodiment of the disclosure. As illustrated in FIG. 15, the BS of the disclosure may include a BS processor 1501, a receiver 1502, and a transmitter 1503. However, elements of the BS are not limited to the aforementioned example. For example, the BS may include more elements than the aforementioned elements or may include fewer elements than the aforementioned elements. Also, the BS processor 1501, the receiver 1502, and the transmitter 1503 may be integrated to one chip. Also, the BS may further include a memory (not shown).

According to some embodiments, the BS processor 1501 may control a series of procedures to operate the BS according to the afore-described embodiments of the disclosure. For example, the BS processor 1501 may differently control a DL control channel frequency allocation method and a resource mapping method according to an embodiment of the disclosure.

Also, according to some embodiments, the BS processor 1501 may configure a frequency band of a CORESET for at least one UE based on a bandwidth part used by the at least one UE, may provide configuration information via the BS transmitter 1503, and may determine a mapping method with respect to control information and then allocate the control information to a resource element. The BS processor 1501 may include at least one processor.

According to some embodiments, the BS receiver 1502 and the BS transmitter 1503 may be collectively called a transceiver in the disclosure. The transceiver may transmit and receive signals to and from the UE. The signals may include control information and data. To this end, the transceiver may include a RF transmitter for up-converting a frequency of and amplifying a signal to be transmitted, and an RF receiver for low-noise amplifying and down-converting a frequency of a received signal. Also, the transceiver may receive a signal through a wireless channel and output the signal to the BS processor 1501, and may transmit a signal output from the BS processor 1501, through a wireless channel.

According to some embodiments, the memory (not shown) may store the program and data necessary for operations of the BS. Also, the memory may store control signal or data included in a signal obtained by the BS. The memory may be implemented as a storage medium or a combination of storage media including ROM, RAM, a hard disk, CD-ROM, DVD, or the like.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined with each other as required. For example, parts of the embodiments may be combined with each other to enable the BS and the UE to operate. While the embodiments described above are provided based on the NR system, modifications based on the technical scope of the embodiments of the disclosure may be applied to various systems such as a Frequency Division Duplex (FDD) or Time Division Duplex (TDD) LTE system, or the like.

It should be understood that the embodiments of the disclosure in the specification and drawings should be considered in a descriptive sense only and not for purposes of limitation. That is, it will be understood by one of ordinary skill in the art that various changes in form and details may be made based on the technical concept of the disclosure. Also, the embodiments of the disclosure may be combined with each other as required.

The invention claimed is:

1. A method performed by a user equipment (UE), the method comprising:
receiving, via higher layer signaling, control resource sets (CORESET) configuration information including frequency resource allocation information and offset information on a frequency domain, wherein the frequency resource allocation information includes a bitmap of a plurality of resource block (RB) groups and the offset information indicates a frequency offset in a unit of an RB;
identifying the CORESET, based on the bitmap of the plurality of RB groups and the frequency offset in the unit of the RB; and
monitoring downlink control information based on the identified CORESET,
wherein a location of a first RB in the CORESET is identified based on a summation of an index of a start RB among a plurality of RBs included in a bandwidth part configured for the UE and the frequency offset, and wherein the CORESET is identified based on the bitmap, from the identified location of the first RB.

2. The method of claim 1, wherein bits of the bitmap have one-to-one mapping with the plurality of RB groups.

3. The method of claim 2, wherein each of the plurality of RB groups includes 6 RBs.

4. The method of claim 1, wherein the frequency offset in the unit of the RB is configured to have a value D, that is 0≤D<6.

5. A method performed by a base station (BS), the method comprising:

transmitting, via higher layer signaling, control resource sets (CORESET) configuration information including frequency resource allocation information and offset information on a frequency domain, wherein the frequency resource allocation information includes a bitmap of a plurality of resource block (RB) groups and the offset information indicates a frequency offset in a unit of an RB; and transmitting downlink control information on the CORESET identified based on the bitmap of the plurality of RB groups and the frequency offset in the unit of the RB, wherein a location of a first RB in the CORESET is identified based on a summation of an index of a start RB among a plurality of RBs included in a bandwidth part configured for the UE and the frequency offset, and wherein the CORESET is identified based on the bitmap, from the identified location of the first RB.

6. The method of claim 5, wherein bits of the bitmap have one-to-one mapping with the plurality of RB groups.

7. The method of claim 6, wherein each of the plurality of RB groups includes 6 RBs.

8. The method of claim 5, wherein the frequency offset in the unit of the RB is configured to have a value D that is 0≤D<6.

9. A user equipment (UE) comprising:

a transceiver; and a processor coupled with the transceiver and configured to:

receive, via higher layer signaling, the transceiver, control resource sets (CORESET) configuration information including frequency resource allocation information and offset information on a frequency domain, wherein the frequency resource allocation information includes a bitmap of a plurality of resource block (RB) groups and the offset information indicates a frequency offset in a unit of an RB, identify the CORESET, based on the bitmap of the plurality of RB groups and the frequency offset in the unit of the RB, and monitor downlink control information based on the identified CORESET, wherein a location of a first RB in the CORESET is identified based on a summation of an index of a start RB among a plurality of RBs included in a bandwidth part configured for the UE and the frequency offset, and wherein the CORESET is identified based on the bitmap, from the identified location of the first RB.

10. The UE of claim 9, wherein bits of the bitmap have one-to-one mapping with the plurality of RB groups.

11. The UE of claim 10, wherein each of the plurality of RB groups includes 6RBs.

12. The UE of claim 9, wherein the frequency offset in the unit of the RB is configured to have a value D, that is 0≤D<6.

13. A base station (BS) comprising:

a transceiver; and a processor coupled with the transceiver and configured to:

transmit, via higher layer signaling, control resource sets (CORESET) configuration information including frequency resource allocation information and offset information on a frequency domain, wherein the frequency resource allocation information includes a bitmap of a plurality of resource block (RB) groups and the offset information indicates a frequency offset in a unit of an RB, and transmit downlink control information on the CORESET identified based on the bitmap of the plurality of RB groups and the frequency offset in the unit of the RB, wherein a location of a first RB in the CORESET is identified based on a summation of an index of a start RB among a plurality of RBs included in a bandwidth part configured for the UE and the frequency offset, and wherein the CORESET is identified based on the bitmap, from the identified location of the first RB.

14. The BS of claim 13, wherein bits of the bitmap have one-to-one mapping with the plurality of RB groups.

15. The BS of claim 14, wherein each of the plurality of RB groups includes 6RBs.

16. The BS of claim 13, wherein the frequency offset in the unit of the RB is configured to have a value D, that is 0≤D<6.

* * * * *